US007865490B2

(12) United States Patent
Nogawa et al.

(10) Patent No.: US 7,865,490 B2
(45) Date of Patent: Jan. 4, 2011

(54) DOCUMENT DATA CREATING APPARATUS, DOCUMENT DATA CREATING METHOD AND CONTROL PROGRAM OF THE SAME

(75) Inventors: Hiroshi Nogawa, Hachioji (JP); Yoko Fujiwara, Kawasaki (JP); Yoshinori Tanaka, Shibuya-ku (JP); Masahiro Ozawa, Hino (JP); Jun Kuroki, Sagamihara (JP); Fumihito Akiyama, Yokohama (JP); Yasufumi Aoyama, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 495 days.

(21) Appl. No.: 11/973,713

(22) Filed: Oct. 10, 2007

(65) Prior Publication Data

US 2008/0256105 A1 Oct. 16, 2008

(30) Foreign Application Priority Data

Nov. 28, 2006 (JP) ............................. 2006-320018

(51) Int. Cl.
*G06F 17/30* (2006.01)
(52) U.S. Cl. ............................. 707/705; 707/999.001; 707/999.01; 707/999.009
(58) Field of Classification Search ....................... None
See application file for complete search history.

(56) References Cited

U.S. PATENT DOCUMENTS 6,285,991 B1 * 9/2001 Powar .......................... 705/76

| 6,487,301 | B1 * | 11/2002 | Zhao | 382/100 |
|---|---|---|---|---|
| 6,751,336 | B2 * | 6/2004 | Zhao | 382/100 |
| 6,993,510 | B2 * | 1/2006 | Guy et al. | 705/68 |
| 7,222,235 | B1 * | 5/2007 | Mitsui | 713/176 |

(Continued)

FOREIGN PATENT DOCUMENTS

JP 1-163871 A 6/1989

(Continued)

OTHER PUBLICATIONS

Japanese "Office Action" dated Sep. 3, 2008 for counterpart Japanese Application No. 2006-320018; Together with an English-language translation thereof.

(Continued)

*Primary Examiner*—Jean M Corrielus
(74) *Attorney, Agent, or Firm*—Sidley Austin LLP

(57) ABSTRACT

There is described a document data creating apparatus, a document data creating method and a program thereof, which make it possible to improve convenience of both the user and the creator of the document data by effectively utilizing the digital signature. The apparatus for creating document data that include a digital signature, includes: a character recognizing section to recognize a character based on image data inputted; a reliability determining section to determine a reliability degree of the character; a characteristic value calculating section to calculate a characteristic value of the document data; and a digital signature section to attach the characteristic value to the document data. When the reliability determining section determines that the reliability degree of the character is low, the digital signature section attaches a value, which is different from the characteristic value calculated by the characteristic value calculating section, to the document data as the digital signature.

21 Claims, 19 Drawing Sheets

U.S. PATENT DOCUMENTS

| | | | |
|---|---|---|---|
| 7,426,495 B1 * | 9/2008 | Corless | 705/75 |
| 7,586,641 B2 * | 9/2009 | Takaragi et al. | 358/1.9 |
| 7,702,624 B2 * | 4/2010 | King et al. | 707/999.004 |
| 7,747,495 B2 * | 6/2010 | Malaney et al. | 705/35 |
| 2003/0120611 A1 * | 6/2003 | Yoshino et al. | 705/67 |

FOREIGN PATENT DOCUMENTS

| | | |
|---|---|---|
| JP | 3-151738 A | 6/1991 |
| JP | 6-224896 A | 8/1994 |
| JP | 10-154976 A | 6/1998 |
| JP | 2004-13813 A | 1/2004 |
| JP | 2005-267022 A | 9/2005 |
| JP | 2006-165944 A | 6/2006 |

OTHER PUBLICATIONS

M. Takenaka et al, "An Implementation of Partial Integrity Assurance Technology for Image Data", Technical Report of ISEC (ISEC2005-43 to 75, Jul. 15, 2005), The Institute of Electronics, Information and Communication Engineers (IEICE), Japan, vol. 105, No. 194, 9 pages; Together with a Partial Translation.

Japanese "Office Action" dated Oct. 2, 2009 for counterpart Japanese Application No. 2006-320018; Together with an English-language translation thereof.

* cited by examiner

30: COMPUTER TERMINAL DEVICE

FIG. 6

CREATED DOCUMENT DATA
(WITH DIGITAL SIGNATURE)

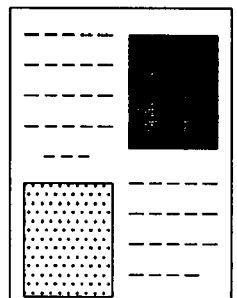

DIGEST VALUE
03ab42ffea3

⇩

 CALCULATING DIGEST VALUE FROM CHARACTERISTIC VALUE OF TEXT DATA      CALCULATING DIGEST VALUE FROM CHARACTERISTIC VALUE OF IMAGE DATA

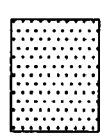 CALCULATING DIGEST VALUE FROM CHARACTERISTIC VALUE OF IMAGE DATA      CALCULATING DIGEST VALUE FROM CHARACTERISTIC VALUE OF TEXT DATA

⇩

RECALCULATING DIGEST VALUE OF WHOLE DOCUMENT FROM INDIVIDUAL DIGEST VALUES

⇩

RECALCULATED DIGEST VALUE 03ab42ffea3 ⟵ COMPARISON ⟶ ATTACHED DIGEST VALUE 03ab42ffea3

⇩

SINCE RECALCULATED DIGEST VALUE COINCIDES WITH ATTACHED DIGEST VALUE, DOCUMENT CAN BE DETERMINED AS VALID

10: PRINTING SYSTEM

30: COMPUTER TERMINAL DEVICE

FIG. 24

```
<Fixed Page>
  <Glyphs Font Uri="/Resouces/Fonts/42B9EEF2-C8D5-4B49-A9DB-1DD68B74B8AAodttf"
    Unicode String="abodefg"/>
</Fixed Page>
```

DOCUMENT DATA CREATING APPARATUS, DOCUMENT DATA CREATING METHOD AND CONTROL PROGRAM OF THE SAME

This application is based on Japanese Patent Application No. 2006-320018 filed on Nov. 28, 2006 with Japan Patent Office, the entire content of which is hereby incorporated by reference.

BACKGROUND OF THE INVENTION

The present invention relates to a document data creating apparatus for creating document data, a document data creating method to be employed in the abovementioned apparatus and a control program to be executed in abovementioned apparatus concerned.

In recent years, there have been increasingly proliferated in the market various kinds of copiers or multi-functional apparatuses, each provided with a combination of plural functions, such as a copy function, a facsimile function, a printer function, a scanner function, etc., (hereinafter, referred to as an image forming apparatus as a general term for each of them). When the image forming apparatus is employed as the network printer to implement the printing operation, at first, the concerned document is created by using the application program installed in advance in the computer terminal device coupled to the network, and then, the created document is converted to the document data in the format of the Page Description Language (hereinafter, also referred to as the PDL, for simplicity), so as to be transmitted to the image forming apparatus concerned. Receiving the document data from the computer terminal device, the image forming apparatus parses the document data to create intermediate data, and then, further converts the intermediate data to bitmap data, so as to output an image based on the bitmap data onto a paper medium.

On that occasion, since there is a fear that the print data to be transmitted through the network might be possibly falsified during the transmitting operation of the document data, the method for judging the validity of the document data by employing a digital signature has been usually employed. For instance, Japanese Non-Examined Patent Publication No. 2005-267022 sets forth a method in which: the digital signature and the electronic certificate attached to the document data concerned are used to decrypt the digital signature by employing the public key included in the electronic certificate to acquire hash values; the hash values inherent to the document data are compared with the hash values acquired; the document data is determined to not to be falsified if the hash values inherent to the document data coincide with those acquired; document data including hidden character information is created to output to the printer concerned; and thus the printer prints an image represented by the document data including the hidden character information.

According to the conventional method mentioned in the above, there has been such a problem that, although it is possible to detects the manipulation (falsification) made by third person after the document data have been created, it is unable to effectively utilize the digital signature, since none of countermeasures are taken into account to prevent manipulations and modifications, such as, an artificial change made by the operator, an unintentional change caused by an apparatus characteristic, etc., which would be possible made during the creating operation of the document data.

SUMMARY OF THE INVENTION

To overcome the abovementioned drawbacks in conventional document data creating apparatus and method, it is one of objects of the present invention to provide a document data creating apparatus, a document data creating method and a program thereof, which make it possible to improve convenience of both the user and the creator of the document data by effectively utilizing the digital signature.

Accordingly, at least one of the objects of the present invention can be attained by any one of the document data creating apparatus, the document data creating method and the program thereof, described as follows.

(1) According to a document data creating apparatus reflecting an aspect of the present invention, the document data creating apparatus for creating document data that include a digital signature, comprises: a characteristic value calculating section to calculate a characteristic value of the document data; and a digital signature section to attach a value, which is different from the characteristic value calculated by the characteristic value calculating section, to the document data as the digital signature to be included in the document data.

(2) According to a document data creating method reflecting another aspect of the present invention, the document data creating method for creating document data that include a digital signature, comprises: recognizing a character based on image data inputted; determining a reliability degree of the character recognized in the recognizing step; calculating a characteristic value of the document data; and attaching the characteristic value, serving as the digital signature, to the document data; wherein, when it is determined that the reliability degree of the character is low, a value, which is different from the characteristic value calculated in the calculating step, is attached to the document data as the digital signature to be included in the document data.

(3) According to a computer readable medium reflecting still another aspect of the present invention, the computer readable medium storing a computer executable program for creating document data that include a digital signature, the program comprises program code for causing a computer to perform the steps of: calculating a characteristic value of the document data; and attaching a value, which is different from the characteristic value calculated in the calculating step, to the document data as the digital signature to be included in the document data.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows an explanatory schematic diagram for explaining a procedure of utilizing document data (in a case that document data are not falsified) in the first embodiment of the present invention;

FIG. 24 shows an example of command descriptions.

DETAILED DESCRIPTION OF THE PREFERRED EMBODIMENT

Figure 1:
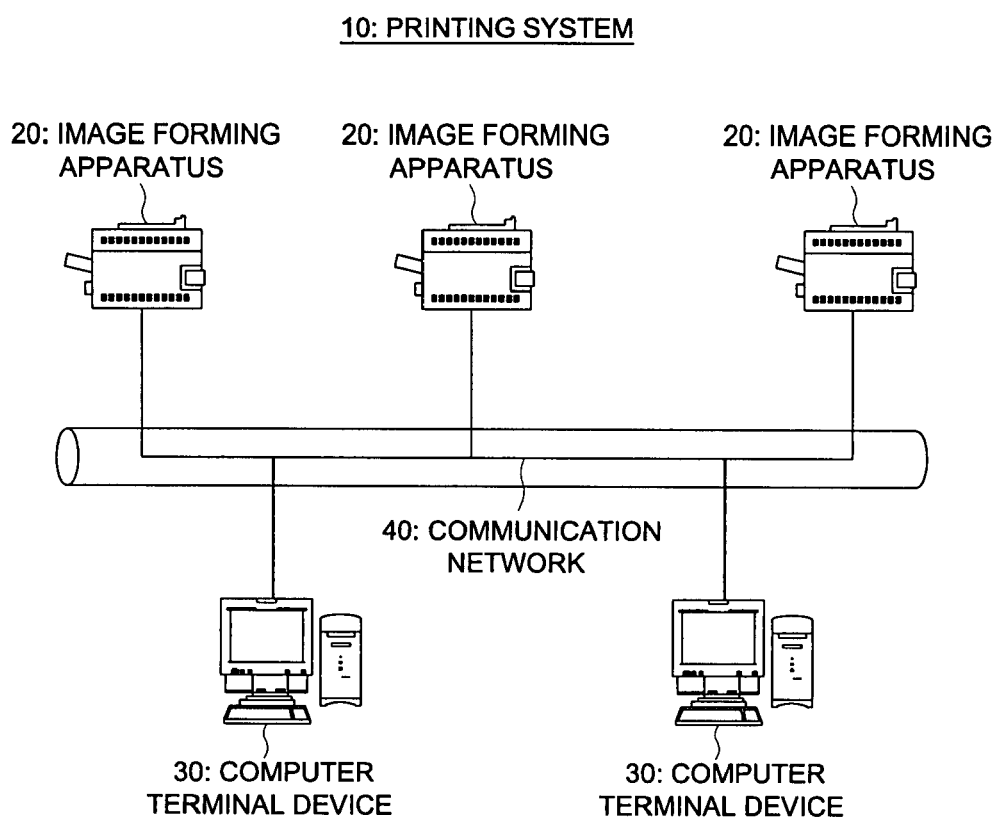
FIG. 1 shows a schematic diagram of a configuration of a printing system embodied in the present invention as the first embodiment.

The well-known as an application program for creating a document is such the application program that is operated on the basis of a standard called the XPS (XML Paper Specification) for describing the document in the form of the XML (Extensible Markup Language). The document created on the basis of the XPS can be displayed by employing the Internet Explorer ®. Further, according to features of the XPS, it is possible to store font data, so that an image displayed on the screen can be printed onto a certain recording medium as it is displayed.

Further, according to the XPS, it is possible to attach a characteristic value (hereinafter, referred to as a "digest value") to a part, which is an object to be printed and included in a print product based on the document data, such as a text, an image, etc., and hereinafter, referred to as an "object". Accordingly, it becomes possible to determine whether each of the objects is valid or not, by exploiting the digest value mentioned in the above.

However, since the digest value is attached to each of the objects after the document data is created, for instance, when a scanner section reads a paper document (hereinafter, a document made of various kinds of sheet materials, such as a paper, a plastic film, etc., is called a paper document as its general term), and then, a character recognizing section recognizes characters so as to create the document data, sometimes, the character recognizing section would erroneously recognize a character as another character. Accordingly, in such the case that the document data have been created on the basis of an invalid object as abovementioned, there has been a problem that the print product, on which the invalid object was printed, would be provided to the user, even if validity of the digital signature was determined by employing the digest value attached thereafter.

Further, since, sometimes, there arises such a case that some objects can be disclosed for all of the users, while it is desirable that other objects are disclosed only for specific users, namely, it is desirable to limit the disclosure of the object to the qualified users, there has been another problem that, in the conventional configuration in which all of the objects having valid digital signatures are printed, the objects to be concealed are also opened to the public.

To overcome the abovementioned drawback, according to the present embodiment embodied in the present invention, the system is so constituted that, when creating the document data based on the XPS, etc., with respect to a specific object, a value being different from a value properly calculated from the specific object can be attached to the specific object as its digest value, so as to make it possible to recognize an object having a low-level reliability for the character recognition, and/or so as to make it possible not to print the specific object concerned, in order to solve the above problem. Further, by effectively utilizing the digital signature as mentioned in the above, the present invention intends to improve the convenience of the creator and the user of the document data. In this connection, with respect to the PDF (Portable Document Format) document data, since the digest value is attached to the whole document data, the system is so constituted that a value being different from a value properly calculated from the document data can be attached to the document data as its digest value, so as to make it possible to recognize document data having a low-level reliability for the character recognition, and/or so as to make it possible not to print the document represented by the document data concerned. Referring to the drawings, the abovementioned systems will be detailed in the following.

Embodiment 1

Figure 2:
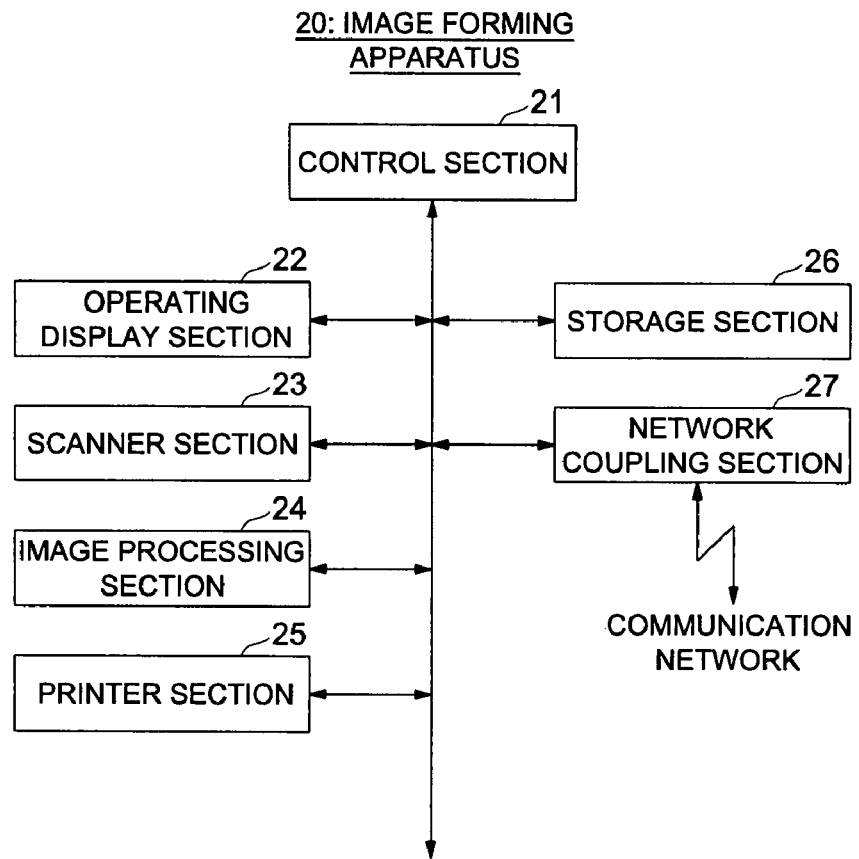
FIG. 2 shows a block diagram indicating a configuration of an image forming apparatus embodied in the present invention as the first embodiment.
Figure 3:
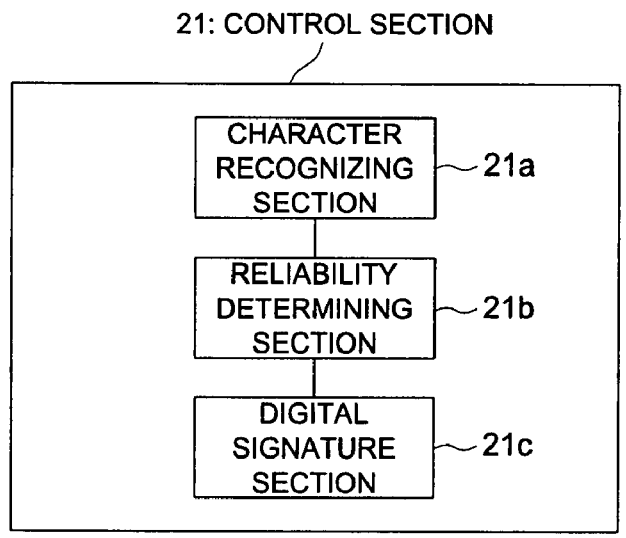
FIG. 3 shows a block diagram indicating a configuration of a control section of an image forming apparatus embodied in the present invention as the first embodiment.
Figure 4:
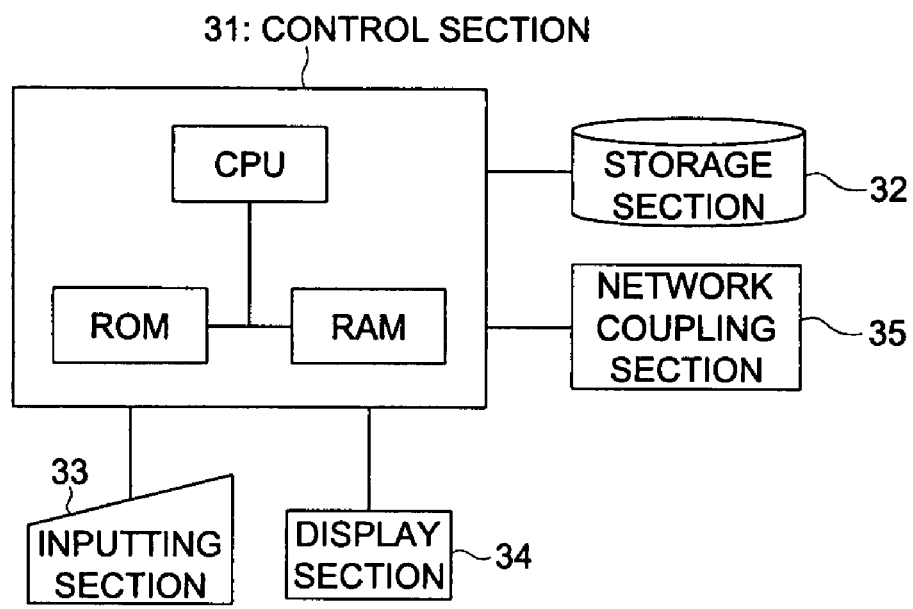
FIG. 4 shows a block diagram indicating a configuration of a computer terminal device embodied in the present invention as the first embodiment.
Figure 5:
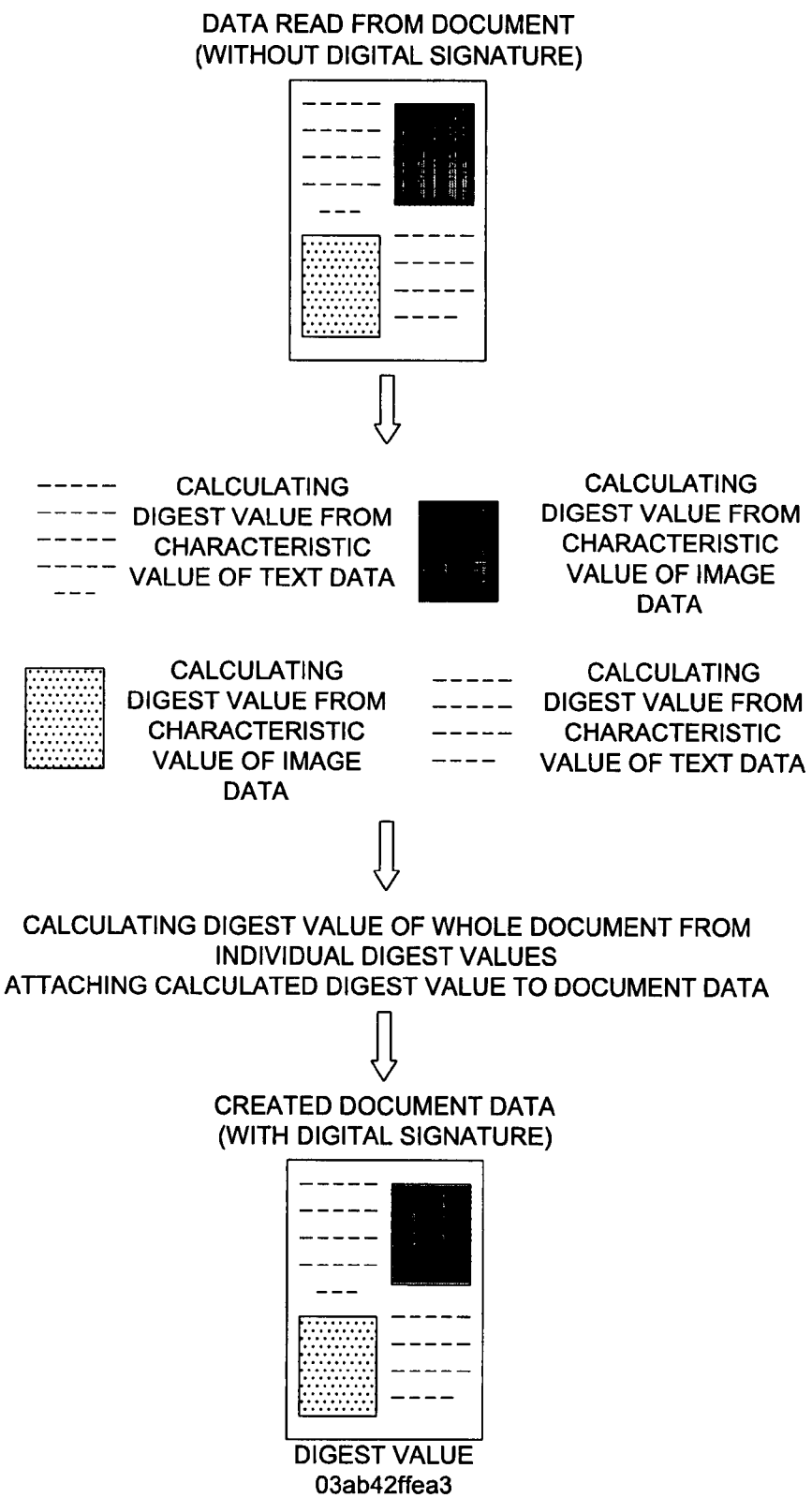
FIG. 5 shows an explanatory schematic diagram for explaining a procedure of creating document data in the first embodiment of the present invention.
Figure 7:
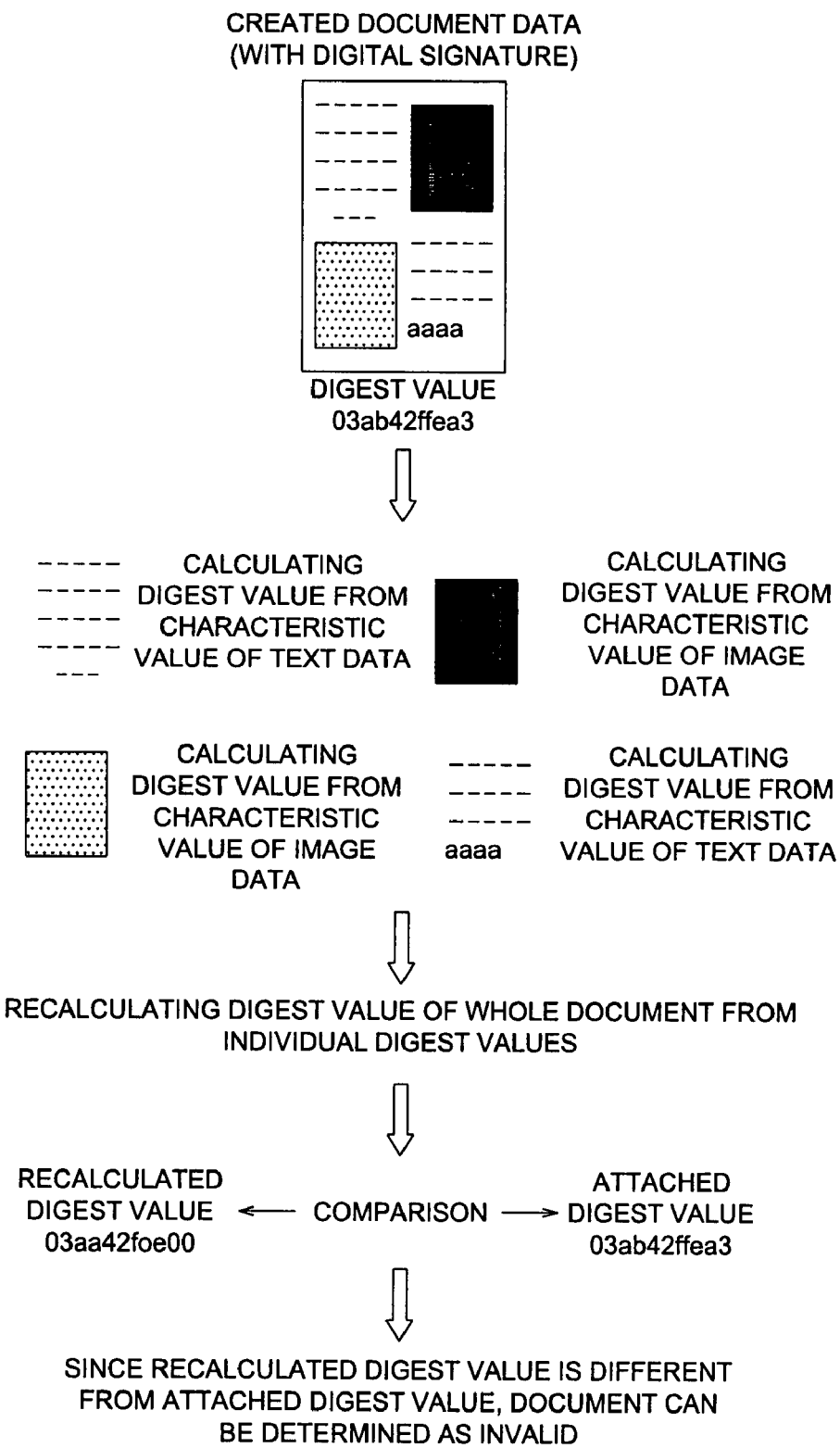
FIG. 7 shows an explanatory schematic diagram for explaining a procedure of utilizing document data (in a case that document data are falsified) in the first embodiment of the present invention.
Figure 8:
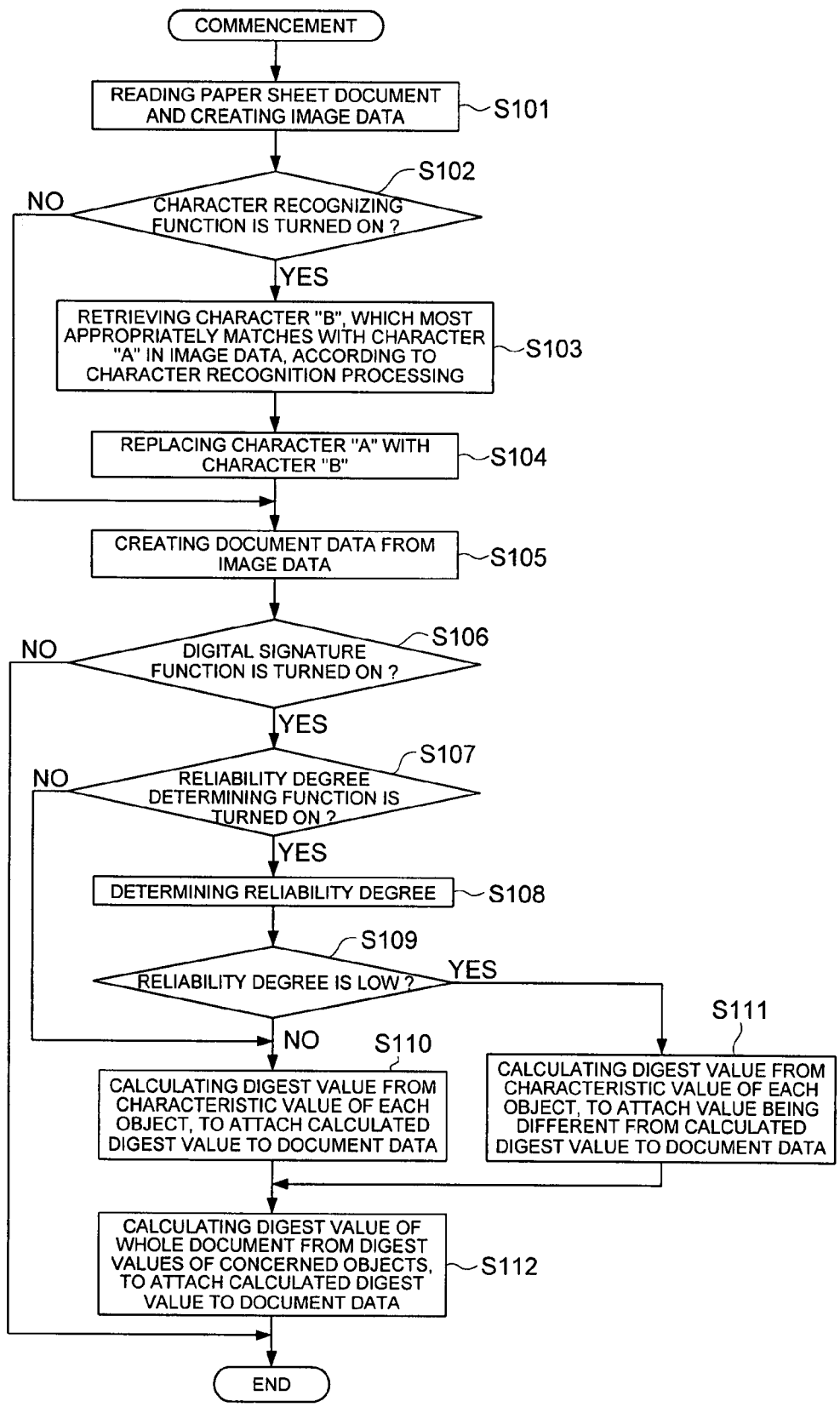
FIG. 8 shows a flowchart indicating a procedure for creating document data in an image forming apparatus embodied in the present invention as the first embodiment.
Figure 9:
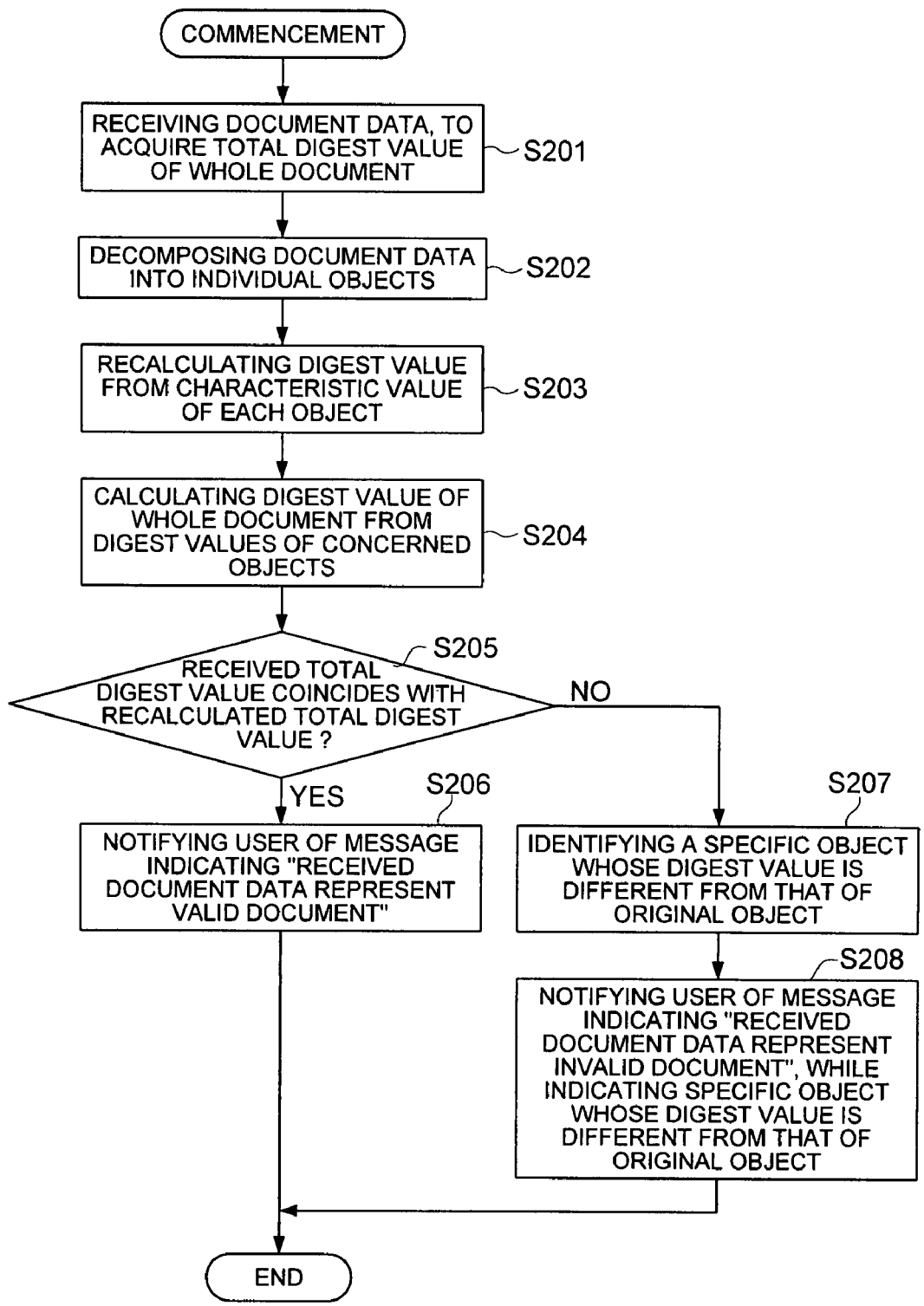
FIG. 9 shows a flowchart indicating a procedure for utilizing document data in a computer terminal device embodied in the present invention as the first embodiment.

In order to describe the preferred embodiment of the present invention in detail, referring to FIG. 1 through FIG. 9, an image forming apparatus and a document data creating method and a control program, embodied in the present invention as the first embodiment, will be detailed in the following. FIG. 1 shows a schematic diagram of a configuration of the printing system embodied in the present invention; FIG. 2 shows a block diagram indicating a configuration of the image forming apparatus; FIG. 3 shows a block diagram indicating a configuration of a control section of the image forming apparatus; and FIG. 4 shows a block diagram indicating a configuration of a computer terminal device. Further, FIG. 5 shows an explanatory schematic diagram for explaining a procedure of creating the document data in the present embodiment, while FIG. 6 and FIG. 7 show explanatory schematic diagrams for explaining procedures of utilizing the document data in the present embodiment. Further, FIG. 8 shows a flowchart indicating a procedure for creating the document data in the image forming apparatus embodied in the present invention, and FIG. 9 shows a flowchart indicating a procedure for utilizing the document data in the computer terminal device embodied in the present invention.

The digital signature employed in the conventional scanning practice is attached to the document data acquired by scanning a paper document, so that the digital signature has a function for certifying the fact that the document data have not been falsified thereafter. For instance, Japanese Non-Examined Patent Publication No. 2006-165944 sets forth a technology for attaching the digital signature to the data generated by combining the character recognition result of the image data, derived by the character recognizing function, with each of the characteristic values of the image data, so as to specify a falsified place (or a position) by comparing the characteristic value derived as the result of the character recognizing operation with that stored in advance, when the image data are falsified.

However, when erroneous information is read out from the paper document serving as the scanning object, due to the recognition error, etc. made by the character recognizing function, since the document data is created on the basis of the erroneous information, it is impossible to provide correct information to the user, even if the manipulation of the document data is prevented by employing the digital signature.

Accordingly, in the present embodiment, the digital signature is employed for certifying whether or not each information acquired from the paper document is falsified during a time interval until all of the document data have been created from the paper document serving as the scanning object. In other words, the purpose of the embodiment of the present invention is not to determine whether or not the created document data are fraudulently altered after the creating operation of the document data has been completed, but to determine a degree of reliability of the character recognition processing to be performed in the character recognizing function. Further, by setting the character value of the digital signature based on the result of determining the degree of reliability, it is specified whether or not the character recognition processing is correctly performed in the character recognizing function. When the miss-recognition error, etc. possibly exists in the created document data, the present embodiment makes it possible to specify the place (or the position) of the error concerned.

For instance, when the character recognizing function is turned OFF at the time of the scanning operation, since all of the information included in the paper document are recognized as an image, erroneous recognition of various kinds of characters, such as an alphabetical character, a Japanese "hiragana" character, a Japanese "katakana" character, a numeric character, a symbol, etc., (hereinafter, called a character as its general term) could never occur. However, when the character recognizing function is turned ON at the time of the scanning operation, there arises a fear that a certain character would be erroneously recognized. Accordingly, in the reliability determining function, the characteristic value of the object that includes a character, for which the recognizing reliability in the character recognition processing is low and a fear of occurrence of the character miss-recognition exists, is set at such an abnormal value that is different from the value normally calculated from the object.

According to the above, it becomes possible to notify the user of the document data of the possibility whether or not an important character is erroneously recognized. Further, when the possibility of the character miss-recognition exists, it is also possible to specify a portion of the document data, at which the possibility of the character miss-recognition exists, by recalculating the digest value. For instance, when an important numerical values, such as a sum of money, a date, etc., is written by hand, or when the paper document to be a scanning object is contaminated with dirt, etc., it is possible to notify the user of the document data of the possibility that the character miss-recognition has occurred in the reliability determining function. The abovementioned features of the present invention will be detailed in the following.

As shown in FIG. 1, a printing system 10, embodied in the present invention, includes an image forming apparatus 20 that serves as a document data creating apparatus for creating document data by reading a paper document, a computer terminal device 30, such as a personal computer, etc., that utilizes the document data, and a communication network 40, such as the Ethernet, etc., through which the image forming apparatus 20 and the computer terminal device 30 are coupled to each other. In this connection, the communication network 40 is not limited to the Ethernet, but it is also applicable that any one of the FDDI (Fiber-Distributed Data Interface), the Token Ring, etc., serves as the communication network 40. Further, the communication network is not necessary employed for coupling the image forming apparatus 20 and the computer terminal device 30 to each other, but it is also applicable that those are locally coupled to each other without employing the communication network.

Further, as shown in FIG. 2, the image forming apparatus 20, embodied in the present invention, is provided with a control section 21, an operating display section 22, a scanner section 23, an image processing section 24, a printer section 25, a storage section 26, a network coupling section 27, etc., which are coupled to each other through a bus.

The control section 21 is constituted by a CPU (Central Processing Unit), a ROM (Read Only Memory), a RAM (Random Access Memory), etc. In response to the instructions inputted by operating the operating display section 22, the CPU reads out necessary programs from various kinds of programs stored in the ROM and develops the readout programs into the RAM, so as to control the operations, to be conducted in each section of the image forming apparatus 20, according to the programs developed in the RAM.

Further, as shown in FIG. 3, the control section 21 serves as a character recognizing section 21a that reads a character from the image data read by the scanner section 23 to specify the character by comparing it with a pattern stored in advance, a reliability determining section 21b to determine a reliability of the character recognizing operation conducted by the character recognizing section 21a and a digital signature section 21c to attach a digital signature to each of the object concerned.

In this connection, it is applicable that the reliability determining section 21b and the digital signature section 21c are configured as hardware, or configured as software activated on the control section 21 by executing computer programs, which are configured as such the control programs that make the computer function as the reliability determining section 21b and the digital signature section 21c. Further, the character recognizing section 21a recognizes the character by analyzing the image data, which can be acquired by reading the paper document, for instance, by employing the scanner section 23.

The operating display section 22 is configured by mounting a touch sensing type operating section (namely, touch panel), in which transparent electrodes are aligned in a lattice pattern, onto a display section, such as a LCD (Liquid Crystal Display), etc., so as to display various kinds of operating buttons, a status of the apparatus, operating statuses of each of the sections, etc. on the display section. Further, the operating display section 22 detects X-Y coordinate values at a force applied point, which is pushed by a finger, a touch pen, etc., as voltage values, and output the detected voltage values, serving as positional signals, to control section 21 as the operational signals. In this connection, although the display section and the operating section are integrally configured into the operating display section 22 in the abovementioned configuration, it is needless to say that an operating section, into which various kinds of operating buttons are mounted as hardware, can be disposed separately from the display section.

The scanner section 23 is disposed at an upper space of a platen glass onto which the paper document is placed, so as to read the information recorded on the paper document, and for this purpose, is constituted by a light source to emit light for scanning the paper document, a CCD (Charge Coupled Device) to convert the light reflected from the paper document to electric signals, an analogue-to-digital converter to convert the electric signals outputted from the CCD to digital image data, etc.

The image processing section 24 applies various kinds of image processing, such as an expansion/reduction processing, an image rotation processing, a frequency conversion processing, a color conversion processing from RGB data to YMCK data, a gradation correction processing, and then, outputs the processed digital image data to the printer section 25.

The printer section 25 is provided with an image forming section to form an image to be printed onto a transfer material, a transferring section to transfer the image formed by the image forming section onto the transfer material, a fixing section to fix the transferred image onto the transfer material, a conveyance section to convey the transfer material, a cleaning section to clean the image forming section, the transferring section and the fixing section, etc., so as to electro-photographically form the image onto the transfer material based on the document data inputted from the image processing section 24 and output the transfer material printed with the image.

The storage section 26 is provided with a flash memory, a hard disc drive, etc., to store the document data and other data, such as various kinds of setting conditions, etc. in it.

The network coupling section 27 includes a NIC (Network Interface Card), a modem, a LAN (Local Area Network) adaptor, a router, a TA (Terminal Adapter), etc., so as to conduct the communication controlling operations for controlling the communications with the external apparatuses coupled to the image forming apparatus 20 through the communication network 40.

In this connection, the image forming apparatus 20, shown in FIG. 1, is merely one of examples embodied in the present invention. Any kind of apparatus is applicable in the present invention, as far as the apparatus is provided with at least a function of creating the document data attached with the digital signature. For instance, a scanner apparatus having no printing function, or an MFP (Multi Function Peripheral) apparatus provided with an ADF (Automatic Document Feeder), a post processing apparatus (or a Finisher), etc., is applicable in the present invention.

On the other hand, as shown in FIG. 4, the computer terminal device 30 is constituted by a control section 31 provided with a CPU, a ROM, a RAM, etc., a storage section 32, such as a hard disc drive, etc., to store programs and data in it, an inputting section 33, such as a keyboard, etc., to input instructions for creating the document data and printing the document image, a display section 34, such as an LCD, etc., to display the created document image, the print setting screen, etc., on its display screen, a network coupling section 35, such as a NIC, a modem, etc., to couple the computer terminal device 30 to the communication network 40, etc.

In this connection, although a personal computer is exemplified as the computer terminal device 30 in FIG. 1, any kind of apparatus capable of utilizing the document data is applicable as the computer terminal device 30 embodied in the present invention. For instance, either a PDA (Personal Digital Assistant) or a cellular phone is also applicable as the computer terminal device 30.

Next, referring to the flowchart shown in FIG. 8 and the conceptual schematic diagram shown in FIG. 5, the procedure, to be conducted in the image forming apparatus 20 for creating the document data after reading the paper document, will be detailed in the following.

Initially, the operator sets the paper document onto the image forming apparatus 20, and inputs instructions for activating (turning ON) the character recognizing function, the reliability degree determining function and the digital signature function from the operating display section 22, so as to commence the scanning operation in the effective state of the above functions. Then, the scanner section 23 scans the paper document with the light emitted from the light source, and converts the light reflected from the paper document and received by the CCD to electric signals according to the photo-electric converting actions performed in the CCD, and further converts the electric signals outputted form the CCD to digital image data by employing the analogue-to-digital converter, so as to create the digital image data (hereinafter, referred to as the image data) representing the information recorded on the paper document (Step S101).

Successively, the control section 21 determines whether or not the character recognizing function is turned ON (Step S102). When determining that the character recognizing function is turned ON, the character recognizing section 21a applies the conventionally well-known character recognition processing to the image data so as to recognize a certain character (for instance, character "A") (Step S103). By comparing the character "A" with the various characters stored in advance in the storage section 26, the character recognizing section 21a retrieves a certain character (for instance, character "B"), which most appropriately matches with the character "A" (Step S103), and replaces the portion of the image data corresponding to the character "A" with the character "B" retrieved in the above (Step S104).

Still successively, based on the image data, the control section 21 creates the document data, in which data of each object and its layout information are described (Step S105). In this connection, the concrete method for creating the document data from the image data is not specifically limited, and a conventionally well-known method could be employed for this purpose.

Still successively, the control section 21 determines whether or not the digital signature function is turned ON (Step S106). When determining that the digital signature function is turned ON, the control section 21 enters into the processing for attaching the digital signature, and then, further determines whether or not the reliability degree determining function is turned ON (Step S107). When determining that the reliability degree determining function is turned ON, the reliability determining section 21b investigates whether the reliability degree of the character recognition for each object is high or low (Step S108).

Concretely speaking with respect to the method for determining the reliability degree mentioned in the above, for instance, data corresponding to the character "A" included in the original image data are compared with data of the character "B" retrieved in the character recognition processing. When a difference between the character "A" and the character "B" is smaller that the first threshold value determined in advance, and at the same time, another difference, between the character "A" and a character (for instance, character "C"), which is retrieved as such a character that secondary well-matches with the character "A" next to the character "B", is greater than the second threshold value determined in advance, it can be determined that the reliability degree of the character recognition is high.

Still successively, when the reliability determining section 21b determines that the reliability degree of the character recognition is high (Step S109; No), the digital signature section 21c calculates a characteristic value (for instance, a value, such as a hash value, etc., which is derived by the arithmetic calculation method for generating pseudorandom numbers, having a fixed length, from the data of object concerned; hereinafter, referred to as a digest value) from the characteristic amount of each of the objects constituting the document data, so as to attach the digest value to the document data (Step S110).

On the other hand, when the reliability determining section 21b determines that the reliability degree of the character recognition is low (Step S109; Yes), the digital signature section 21c calculates a digest value from the characteristic amount of each of the objects constituting the document data (Step S110), so as to attach a value, which is different form the digest value calculated in the above, to the document data as its digest value (Step S111). In this connection, it is possible to arbitrarily establish the value, which is different form the digest value calculated in the above. For instance, either a value derived by adding or subtracting a predetermined value to/from the digest value calculated in the above, or another value determined in advance is applicable for this purpose.

Successively, the digital signature section 21c calculates a total digest value for the whole document from the digest values of the objects constituting the whole document, so as to attach the total digest value to the document data (Step S112). According to the abovementioned processing, the document data with the digital signature is created, and then, the created document data are transferred to the computer terminal device 30 coupled to the image forming apparatus 20 through the communication network 40, and are stored in the storage section 32 of the computer terminal device 30, or in the storage section 26 of the image forming apparatus 20.

The abovementioned processing is schematically indicated in the schematic diagram shown in FIG. 5. At first, each of the digest values is calculated from each of the characteristic amounts of each of the objects included in the document data (two texts and tow images, in this example). Successively, the total digest value (for instance, "03ab42ffea3") for the whole document is calculated from the digest values of the objects constituting the whole document, and then, is attached to the document data.

Next, referring to the flowchart shown in FIG. 9 and the conceptual schematic diagrams shown in FIG. 6 and FIG. 7, the procedure for utilizing the document data created in image forming apparatus 20 by employing the computer terminal device 30.

The flowchart of the document data utilizing operation to be conducted by the control section 31 of the computer terminal device 30, shown in FIG. 9, includes the steps of: receiving the document data through the communication network 40 to acquire the total digest value of the whole document, attached to the document data received (Step S201); analyzing the document data so as to decompose the document data into individual objects, such as texts and images (Step S202); recalculating each of the digest values from the characteristic amount of each of the objects decomposed in Step S202 (Step S203); recalculating the total digest value of the whole document from the recalculated digest values of the decomposed objects (Step S204); comparing the total digest value of the document data received in Step S201 with the other total digest value recalculated in Step S204 (Step S205); determining that the reliability degree of the character recognition processing, performed by the character recognizing section 21a of the image forming apparatus 20, is high, and accordingly, the received document data represent the valid document, when the both of the total digest values coincide with each other in Step S205; and displaying a message indicating "the received document data represent the valid document" onto the display section 34 so as to notify the user of the document data of the message (Step S206).

On the other hand, the flowchart shown in FIG. 9 further includes the steps of: determining that the reliability degree of the character recognition processing, performed by the character recognizing section 21a of the image forming apparatus 20, is low, and accordingly, the received document data represent the invalid document, when the both of the total digest values are different form each other in Step S205; comparing each of the digest values of the objects acquired by analyzing the document data with each of the other digest values of the objects, recalculated in Step S203, so as to identify a specific object whose digest value is different from that of the original object (Step S207); displaying a message indicating "the received document data represent the invalid document" onto the display section 34, while indicating the specific object possibly including an error, so as to notify the user of the document data of the message.

The abovementioned processing is schematically indicated in the schematic diagrams shown in FIG. 6 and FIG. 7. At first, as shown in FIG. 6, each of the digest values is recalculated from each of the characteristic amounts of the objects included in the document data with the digital signature. Successively, the total digest value for the whole document is recalculated from the digest values recalculated in the above, so as to compare the total digest value attached to the document data (for instance, "03ab42ffea3") with the other total digest value recalculated in the above (for instance, "03ab42ffea3"). Then, in this case, since the both of the total digest values coincide with each other, it is possible to certify that the received document data represent the valid document. On the other hand, as shown in FIG. 7, when the reliability degree of the character recognition processing, performed by the character recognizing section 21a of the image forming apparatus 20, is low, and an abnormal digest value is attached to at least one of the objects concerned, since the total digest value originally attached to the document data (for instance, "03ab42ffea3") is different form the other total digest value recalculated from the digest values of the object (for instance, "03aa42fce00"), it is possible to certify that the received document data represent the invalid document.

In this connection, with respect to the PDF (Portable Document Format) document data, since the digest value is attached to the whole document data, it is possible to certify whether the received document data represent the valid document or the invalid document, by comparing the digest value, attached to the document data, with the recalculated digest value.

As described in the foregoing, the image forming apparatus 20 is provided with the reliability determining section 21b and the digital signature section 21c, so that, when the scanner section 23 reads the paper document and the character recognizing section 21a recognizes the characters recorded on the paper document, the reliability determining section 21b determines the reliability degree of the character recognition processing performed in the character recognizing section 21a, and then, the digital signature section 21c attaches the digest value calculated from the document data concerned or the objects to the document data or the object, whose character recognition reliability is determined as high, while attaches the value different form the digest value calculated from the document data concerned or the objects to the document data or the object, whose character recognition reliability is determined as low, as its digest value. On the other hand, by comparing the attached digest value with the recalculated digest value, the computer terminal device 30, which utilizes the document data, can determine whether the received document data represent the valid document or the invalid document, namely, when both of the digest values coincide with each other, the computer terminal device 30 can determine that the received document data represent the valid document, while, when both of the digest values are different from each other, the computer terminal device 30 can determine that the received document data represent the invalid document. Therefore, according to the aforementioned embodiment of the present invention, it becomes possible for the computer terminal device 30 to notify the user of the character miss-recognition occurring during the document data creating operation, so as to prevent the user from conducting the processing based on the erroneous information, resulting in an improvement of the user's convenience.

Embodiment 2

Figure 10:
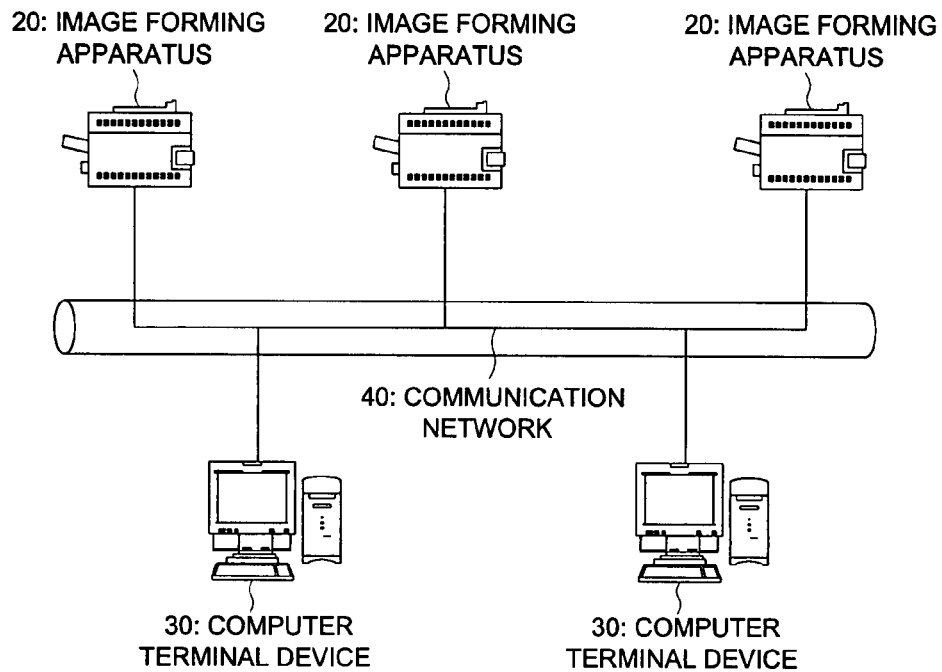
FIG. 10 shows a schematic diagram of a configuration of a printing system embodied in the present invention as the second embodiment.
Figure 11:
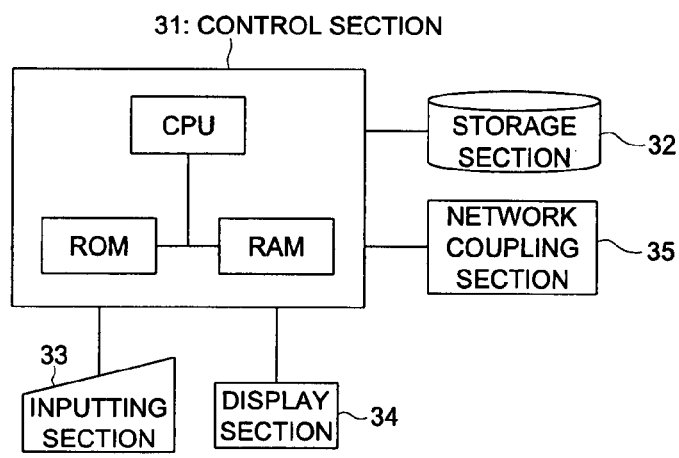
FIG. 11 shows a block diagram indicating a configuration of a computer terminal device embodied in the present invention as the second embodiment.
Figure 21:
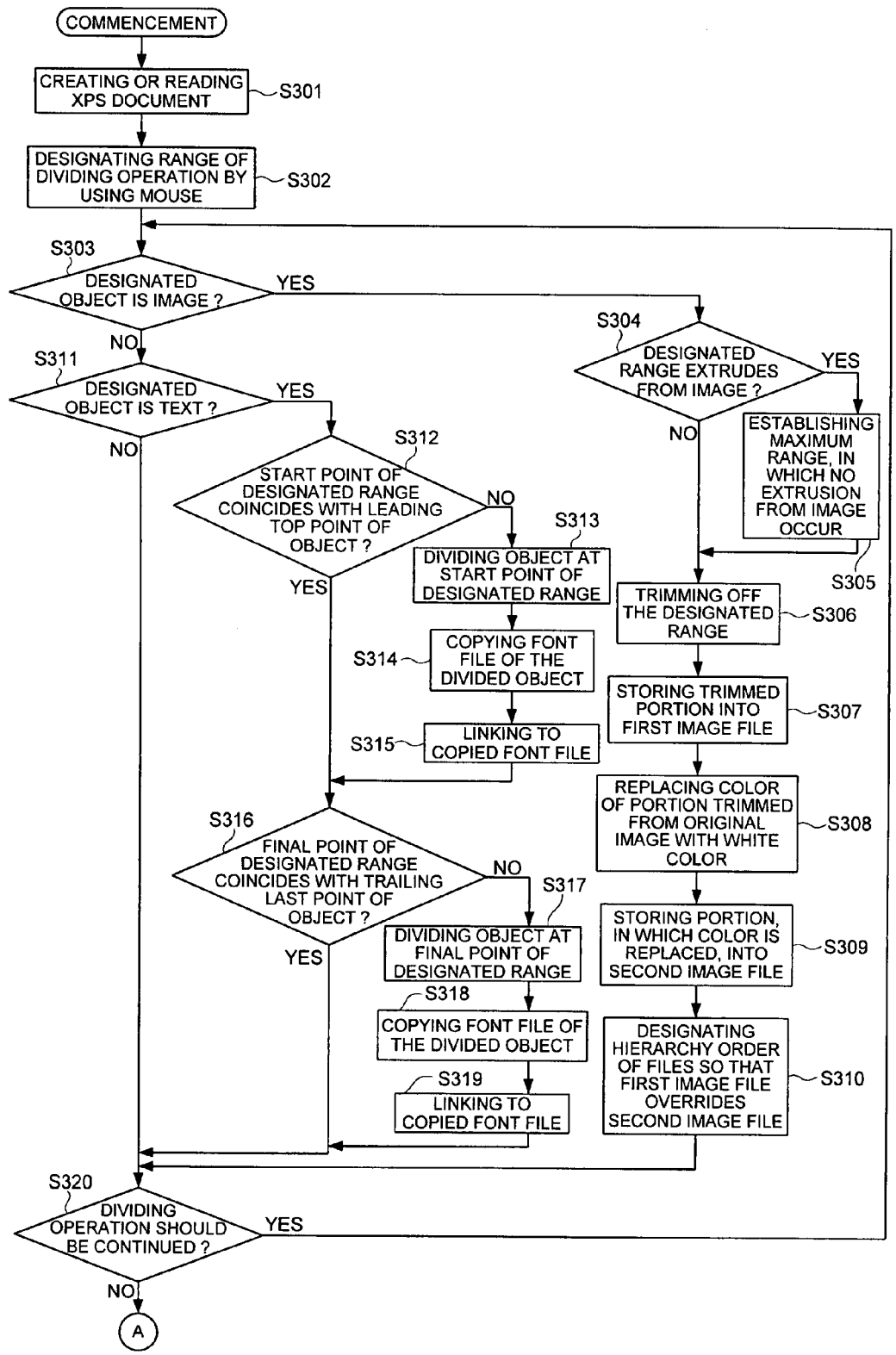
FIG. 21 shows a flowchart for explaining a procedure of creating the document data (a procedure of dividing an object represented by data, which are included in the document data) in the second embodiment of the present invention.
Figure 22:
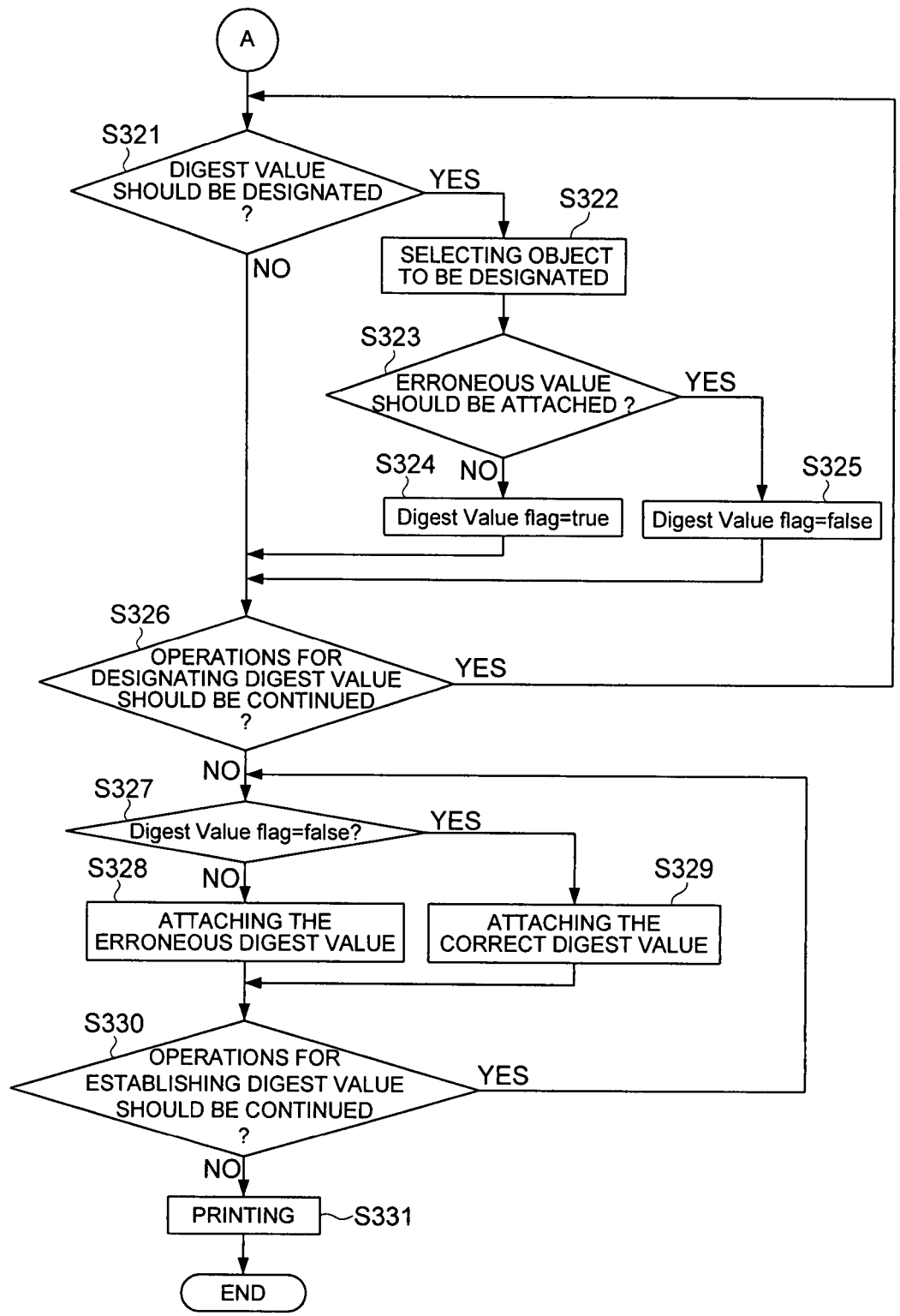
FIG. 22 shows a flowchart for explaining a procedure of creating the document data (a procedure of establishing a digest value for an object represented by data, which are included in the document data) in the second embodiment of the present invention.
Figure 23:
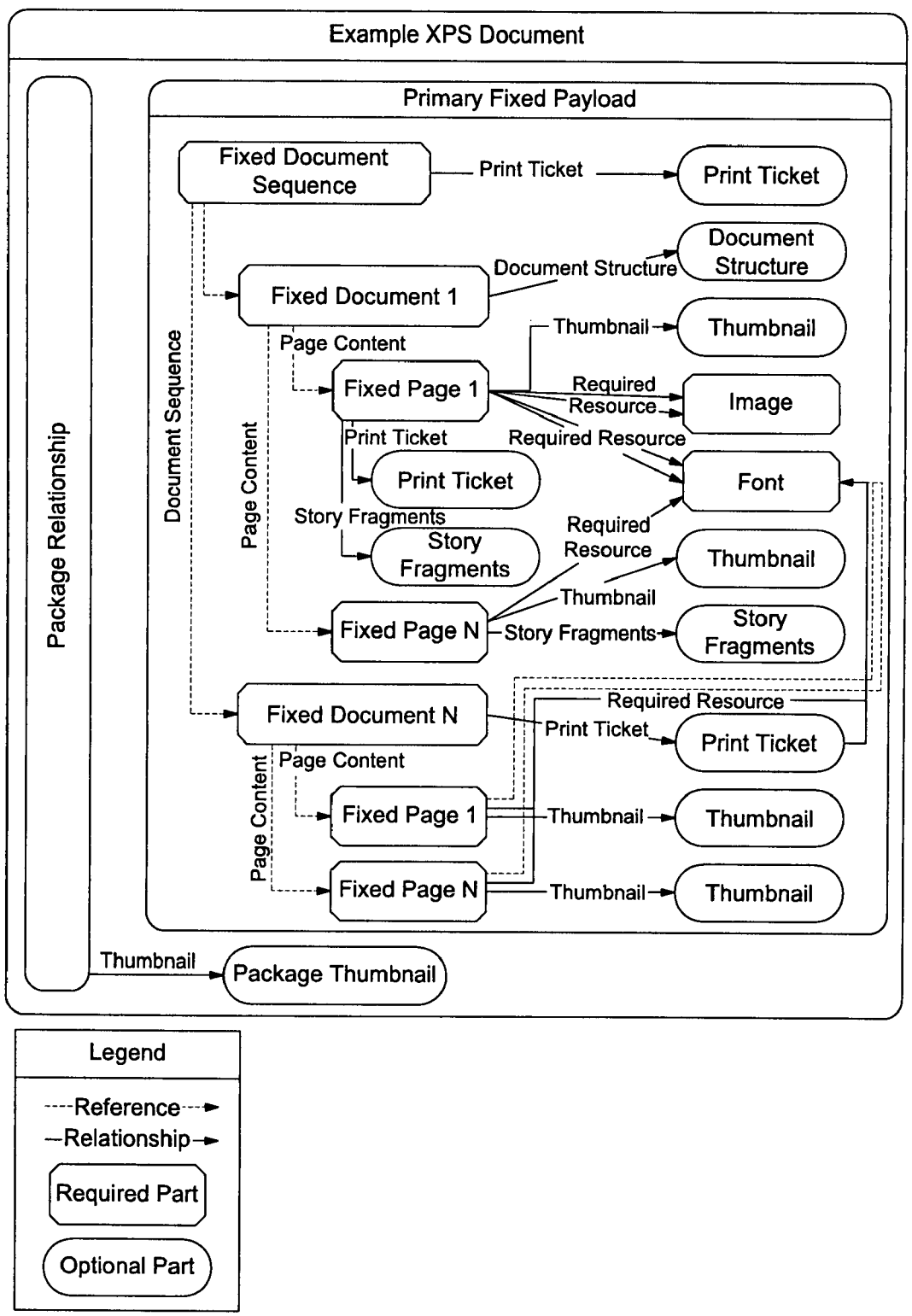
FIG. 23 shows a data structure of the XPS.

Next, referring to FIG. 10 through FIG. 24, a computer terminal device and a document data creating method and a control program, embodied in the present invention as the second embodiment, will be detailed in the following. FIG. 10 shows a schematic diagram of a configuration of the printing system embodied in the present invention, FIG. 11 shows a block diagram indicating a configuration of a computer terminal device and FIG. 13 shows a block diagram indicating a configuration of the image forming apparatus. Further, FIG. 14 through FIG. 20 show explanatory schematic diagrams for explaining procedures of creating the document data in the second embodiment, while FIG. 21 and FIG. 22 show flow-charts for explaining procedures of creating the document data in the second embodiment. Still further, FIG. 23 shows a data structure of the XPS, and FIG. 24 shows an example of command descriptions.

As aforementioned, among the objects included in the document, some objects can be disclosed for all of the users, while it is preferable that some other objects are disclosed only for specific users. Accordingly, it would be convenient, if it were possible to establish whether or not the object concerned should be disclosed, for every object.

However, when the document data are created on the basis of the XPS, since the document data are automatically divided into the objects by executing the application program, and once a structure of the objects is created, it is impossible to change the structure of the objects, there has been a problem that it is impossible for the creator of the document to instruct in detail about whether or not each of the objects should be disclosed, even if the digital signature is attached to every object.

To solve the abovementioned problem, a portion of the document data, such as top-secret information, etc., which is desirably disclosed only for specific users, is intentionally divided into separate objects and stored. Further, when the digital signature is attached to the document data on the basis of the XPS, the digest values to be attached to the divided objects are set at such values that are different from the values properly calculated from characteristic values of the objects, respectively. Then, at the time of printing the document, by setting the printing operation at such a mode that enables the printing apparatus to print only such the objects that have normal digest values. According to above method, it becomes possible to freely instruct about whether or not the object concerned should be disclosed, for every object. The abovementioned feature of the present invention will be detailed in the following.

As shown in FIG. 10, a printing system 10, embodied in the present invention, includes: a computer terminal device 30, such as a personal computer, etc., that serves as a document data creating apparatus for creating document data by employing an application program for creating document data based on the XPS, etc., (hereinafter, referred to as a document creating application program); an image forming apparatus 20 that prints the document based on the document data; and a communication network 40, such as the Ethernet, etc., through which the image forming apparatus 20 and the computer terminal device 30 are coupled to each other. In this connection, the communication network 40 is not limited to the Ethernet, but it is also applicable that any one of the FDDI (Fiber-Distributed Data Interface), the Token Ring, etc., serves as the communication network 40. Further, the communication network is not necessary employed for coupling the image forming apparatus 20 and the computer terminal device 30 to each other, but it is also applicable that those are locally coupled to each other without employing the communication network.

Further, as shown in FIG. 11, the computer terminal device 30 is constituted by a control section 31 provided with a CPU (Central Processing Unit), a ROM (Read Only Memory), a RAM (Random Access Memory), etc., a storage section 32, such as a hard disc drive, etc., to store programs and data in it, an inputting section 33, such as a keyboard, etc., to input instructions for creating the document data and printing the document image, a display section 34, such as an LCD (Liquid Crystal Display), etc., to display the created document image, the print setting screen, etc., on its display screen, a network coupling section 35, such as a NIC (Network Interface Card), a modem, etc., to couple the computer terminal device 30 to the communication network 40, etc. In a normal operating mode, the control section 31 reads out the document creating application program from the ROM or the storage section 32 and develops it into the RAM, while the CPU transmits a command for printing the print object, generated by executing the document creating application program, to the image forming apparatus 20 through the communication network 40, so that the image forming apparatus 20 conducts the printing operation concerned.

Figure 12:
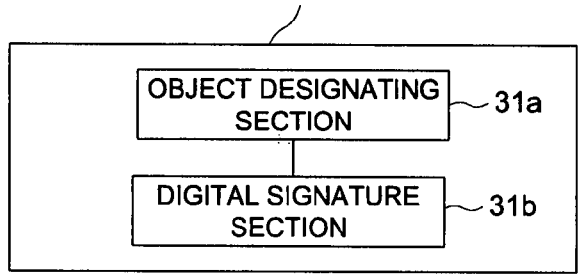
FIG. 12 shows a block diagram indicating a configuration of a computer terminal device embodied in the present invention as the second embodiment.
Figure 13:
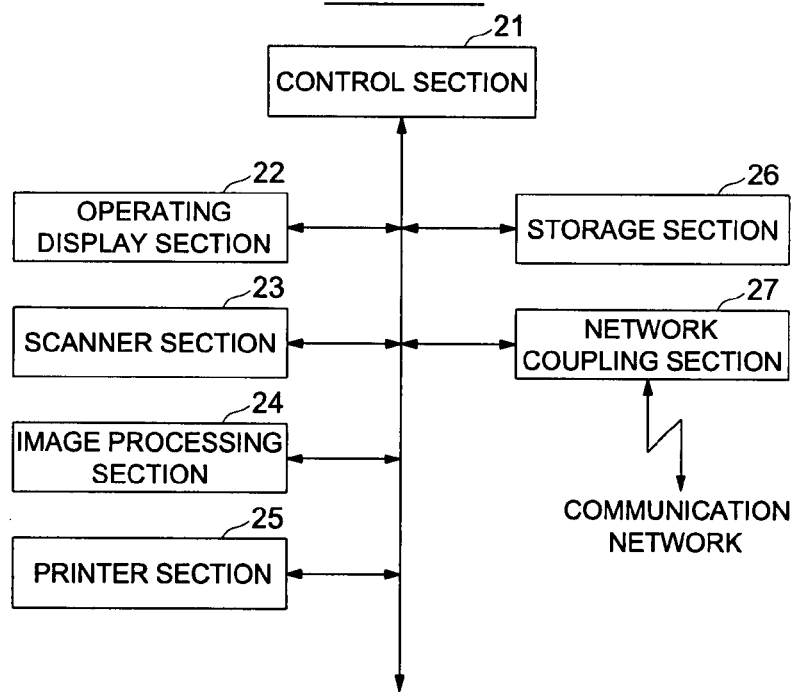
FIG. 13 shows a block diagram indicating a configuration of an image forming apparatus embodied in the present invention as the second embodiment.

Still further, as shown in FIG. 12, the control section 31 serves as an object designating section 31*a* that designates a specific object included in the document, or divides a designated range of an object included in the document into separate objects and a digital signature section 31*b* that attaches the value, being different from the value normally calculated from characteristic value of the object concerned, to the specific object or each of the divided objects. In this connection, it is applicable that the object designating section 31*a* and the digital signature section 31*b* are configured as hardware, or configured as software activated on the control section 31 by executing computer programs, which are configured as such the control programs that make the computer function as the object designating section 31*a* and the digital signature section 31*b*. Further, although a personal computer is exemplified as the computer terminal device 30 in FIG. 10, any kind of apparatus capable of utilizing the document data is applicable as the computer terminal device 30 embodied in the present invention. For instance, either a PDA (Personal Digital Assistant) or a cellular phone is also applicable as the computer terminal device 30.

Further, as shown in FIG. 13, the image forming apparatus 20, embodied in the present invention, is provided with a control section 21, an operating display section 22, a scanner section 23, an image processing section 24, a printer section 25, a storage section 26, a network coupling section 27, etc., which are coupled to each other through a bus.

The control section 21 is constituted by a CPU, a ROM, a RAM, etc. In response to the instructions inputted by operating the operating display section 22, the CPU reads out necessary programs from various kinds of programs stored in the ROM and develops the readout programs into the RAM, so as to control the operations, to be conducted in each section of the image forming apparatus 20, according to the programs developed in the RAM.

Further, the control section 21 parses the document data, such as the XPS data, the PDF (Portable Document Format) data, the data described in the Page Description Language (PDL) being any one of the PS (Post Script), the PCL (Printer Control Language), etc., etc., acquired from the computer terminal device 30 through the communication network 40, so as to create data described in an intermediate format (hereinafter, referred to as intermediate data) to be developed into data described in a bitmap format (hereinafter, referred to as bitmap data) from the acquired document data. In addition to the above, the control section 21 not only creates the bitmap data, based on which the document is directly printable, from the intermediate data, but also analyses the digital signature attached to the document data.

The operating display section 22 is configured by mounting a touch sensing type operating section (namely, touch panel), in which transparent electrodes are aligned in a lattice pattern, onto a display section, such as an LCD, etc., so as to display various kinds of operating buttons, a status of the apparatus, operating statuses of each of the sections, etc. on the display section. Further, the operating display section 22 detects X-Y coordinate values at a force applied point, which is pressed by a finger, a touch pen, etc., as voltage values, and output the detected voltage values, serving as positional signals, to control section 21 as the operational signals. In this connection, although the display section and the operating section are integrally configured into the operating display section 22 in the abovementioned configuration, it is needless to say that an operating section, into which various kinds of operating buttons are mounted as hardware, can be disposed separately from the display section.

The scanner section 23 is disposed at n lower space of a platen glass onto which the paper document is placed, so as to read the information recorded on the paper document, and for this purpose, is constituted by a light source to emit light for scanning the paper document, a CCD (Charge Coupled Device) to convert the light reflected from the paper document to electric signals, an analogue-to-digital converter to convert the electric signals outputted from the CCD to digital image data, etc.

The image processing section 24 applies various kinds of image processing, such as an expansion/reduction processing, an image rotation processing, a frequency conversion processing, a color conversion processing from RGB data to YMCK data, a gradation correction processing, and then, outputs the processed digital image data to the printer section 25.

The printer section 25 is provided with an image forming section to form an image to be printed onto a transfer material, a transferring section to transfer the image formed by the image forming section onto the transfer material, a fixing section to fix the transferred image onto the transfer material, a conveyance section to convey the transfer material, a cleaning section to clean the image forming section, the transferring section and the fixing section, etc., so as to electrophotographically form the image onto the transfer material based on the document data inputted from the image processing section 24 and output the transfer material printed with the image.

The storage section 26 is provided with a flash memory, a hard disc drive, etc., to store the document data and other data, such as various kinds of setting conditions, etc. in it.

The network coupling section 27 includes a NIC (Network Interface Card), a modem, a LAN (Local Area Network) adaptor, a router, a TA (Terminal Adapter), etc., so as to conduct the communication controlling operations for controlling the communications with the external apparatuses coupled to the image forming apparatus 20 through the communication network 40.

In this connection, the image forming apparatus 20, shown in FIG. 13, is merely one of examples embodied in the present invention. Any kind of apparatus is applicable in the present invention, as far as the apparatus is provided with at least a function of printing the document created on the basis of the XPS. For instance, a printer apparatus having no scanner function, or an MFP (Multi Function Peripheral) apparatus provided with an ADF (Automatic Document Feeder), a post processing apparatus (or a Finisher), etc., is applicable in the present invention.

Next, the document data creating method, embodied in the present invention, will be detailed in the following. To make it easy to understand the present embodiment, referring to FIG. 23 and FIG. 24, the XPS (XML Paper Specification) will be detailed at first.

FIG. 23 shows a structure of the XPS data. As shown in FIG. 23, the XPS data is structured by a Fixed Document Sequence in which information of the whole document are stored, a Fixed Page in which information of each page are stored, a Font in which fonts are stored, an Image and a Thumbnail in each of which images are stored, a Print Ticket in which setting information of a printing operation are stored, a Document Structure which indicates a document outline and a document content, a Story Fragments which indicates a document content of a fixed Pages, etc. Further, under each part of the XPS data, an Element, serving as its content, exists, and the Elements are collected together into the object at the time of creating the document data. FIG. 24 shows an example of the description of the object. This example indicates that the character string of "abcdefg" is collected together into one object, and the link to the Font file having the Font information of the object.

Further, in the XPS data having the abovementioned structure, the Keywords for setting the printing modes are established in the Print Ticket. Concretely speaking, three Keywords, including a "Print Invalid Signature" corresponding to a printing mode in which the print job is implemented irrespective of validity of the digital signature, a "Print Invalid Signature With Error Report" corresponding to a printing mode in which the print job is implemented irrespective of validity of the digital signature, while printing a page for indicating being invalid (hereinafter, referred to as an Error Report), and a "Print Only Valid Signature" corresponding to a printing mode in which the print job is implemented only when all of the digital signatures are determined as valid, are normally established as such the abovementioned Keywords. However, in the present embodiment, a fourth Keyword of a "Print Only Valid Part" corresponding to a printing mode in which the printing operation is implemented only for the object whose digest value of the digital signature is correct, while printing an error message with respect to the object whose digest value of the digital signature is incorrect, is added to the three Keywords mentioned in the above.

Next, referring to the flowcharts, shown in FIG. 21 and FIG. 22, and the conceptual schematic diagrams shown in FIG. 14 through FIG. 20, the procedure for creating the document data based on the XPS, to be conducted by employing the computer terminal device 30. Incidentally, both the flowcharts, shown in FIG. 21 and FIG. 22, indicate a consecutive procedure, which is divided into two drawings merely due to the convenience of plotting.

At first, document data based on the XPS are created by employing the document creating application program stored in advance in the computer terminal device 30, or, document data based on the XPS are read into the computer terminal device 30 by employing the document reading application program stored in advance in the computer terminal device 30 (Step S301).

Successively, the creator of the document data designates a range of the dividing operation for a specific object, for which the printing operation is to be restricted and which is included in the objects constituting the XPS document data created or read in Step S301, by using the inputting section 33 (for instance, a mouse) (Step S302).

Still successively, the object designating section 31a determines whether or not the specific object, serving as the dividing object, is an image (Step S303). When determining that the specific object is an image, the object designating section 31a further determines whether or not the designated range extrudes from the image (Step S304). When determining that the designated range extrudes from the image, the object designating section 31a establishes a maximum range, in which no extrusion from the image occur, as a new designated range (Step S305). Then, the object designating section 31a trims off the designated range from the original image (Step S306), so as to store the trimmed portion into a first image file (Step S307). Further, the object designating section 31a replaces the color of the portion trimmed from the original image with a predetermined color (for instance, a white color) (Step S308), so as to store the portion, in which the color is replaced, into a second image file (Step S309). Still further, the object designating section 31a designates the hierarchy order of the files so that the first image file overrides the second image file (Step S310).

Figure 14:
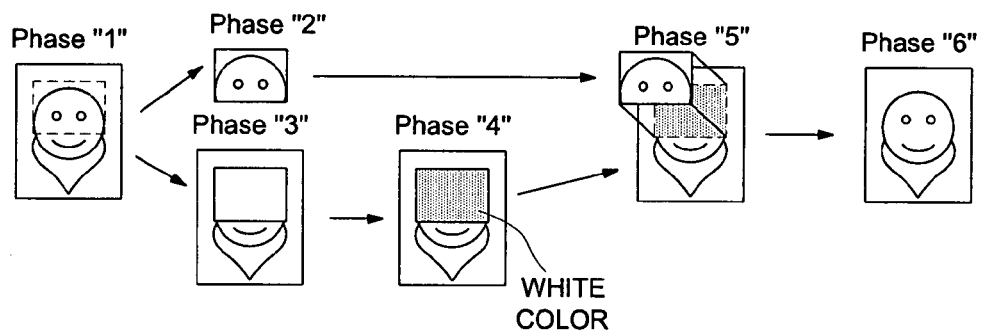
FIG. 14 shows an explanatory schematic diagram for explaining a procedure of creating document data (a procedure of dividing an image represented by image data, which are included in the document data) in the second embodiment of the present invention.
Figure 15:
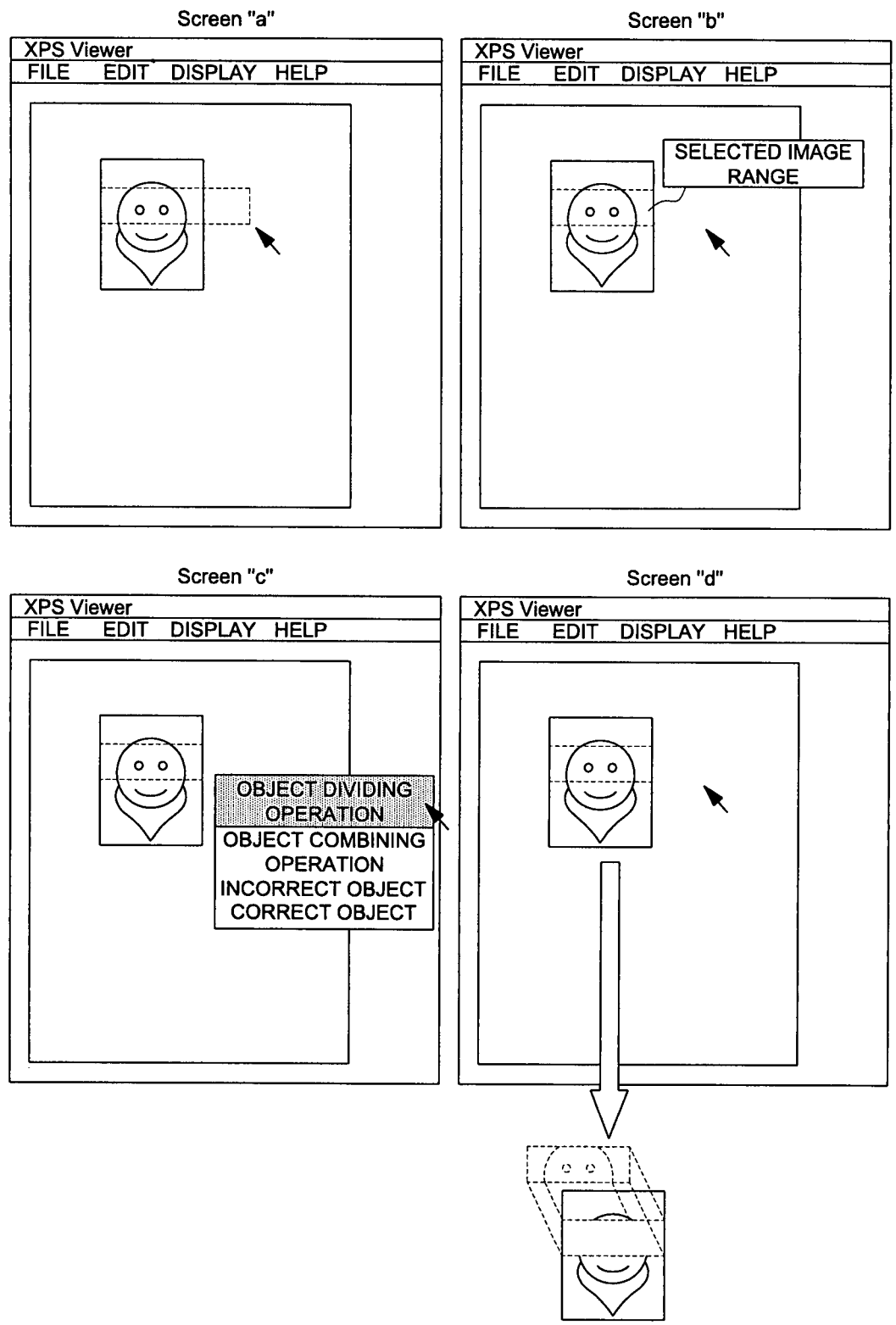
FIG. 15 shows an explanatory drawing for explaining a procedure of creating document data (screens for dividing an image represented by image data, which are included in the document data) in the second embodiment of the present invention.

The Phases and the Screens shown in FIG. 14 and FIG. 15 schematically indicate transitions of the operations conducted in Step S304 through Step S310. As shown in FIG. 15, the operations include: designating the dividing range by using the mouse (refer to Screen "a" and Screen "b"); selecting "DIVIDING OPERATION OF OBJECT" from the Edit menu temporally displayed on the screen (refer to Screen "c"); and trimming off the designated range from the original image so as to divide the original image (refer to Screen "d"). As shown in FIG. 14, the operations further include: trimming off the designated range from the original image (refer to Phase "1"); storing the trimmed portion into the first image file as it is (refer to Phase "2"); replacing the color of the portion, trimmed from the original image, with the predetermined color having no relationship with the original image data (for instance, a white color), so as to store the image, in which the color is replaced, into the second image file (refer to Phase "3" and Phase "4"); and superimposing the trimmed portion onto the portion of the image in which the color is replaced (refer to Phase "5"), so as to create a state same as that before the trimming operation (refer to Phase "6").

Still successively, when determining that the specific object, serving as the dividing object, is not an image in Step S303, the object designating section 31a further determines whether or not the specific object is a text (Step S311). When determining that the specific object is a text, the object designating section 31a further determines whether or not a start point of the designated range coincides with a leading top point of the text (Step S312). When determining that the start point do not coincide with the leading top point, the object designating section 31a divides the text at the start point of the designated range (Step S313), and copies the font file of the original text (Step S314), so as to link the copied font file to the text (Step S315). On the other hand, when determining that the start point coincides with the leading top point in Step S312, the object designating section 31a further determines whether or not a final point of the designated range coincides with a trailing last point of the text (Step S316). When determining that the final point do not coincide with the trailing last point, the object designating section 31a divides the text at the final point of the designated range (Step S317), and copies the font file of the original text (Step S318), so as to link the copied font file to the text (Step S319).

Figure 16:
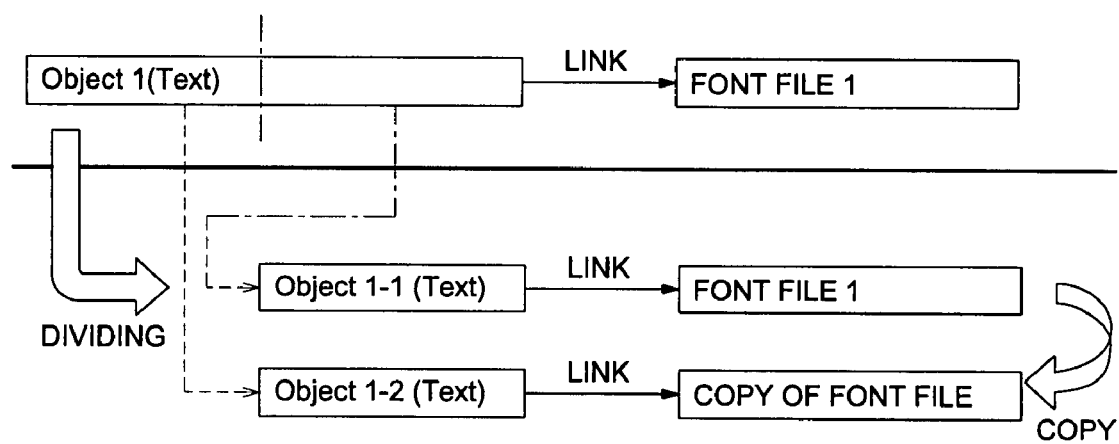
FIG. 16 shows an explanatory schematic diagram for explaining a procedure of creating document data (a procedure of dividing a text represented by text data, which are included in the document data) in the second embodiment of the present invention.
Figure 17:
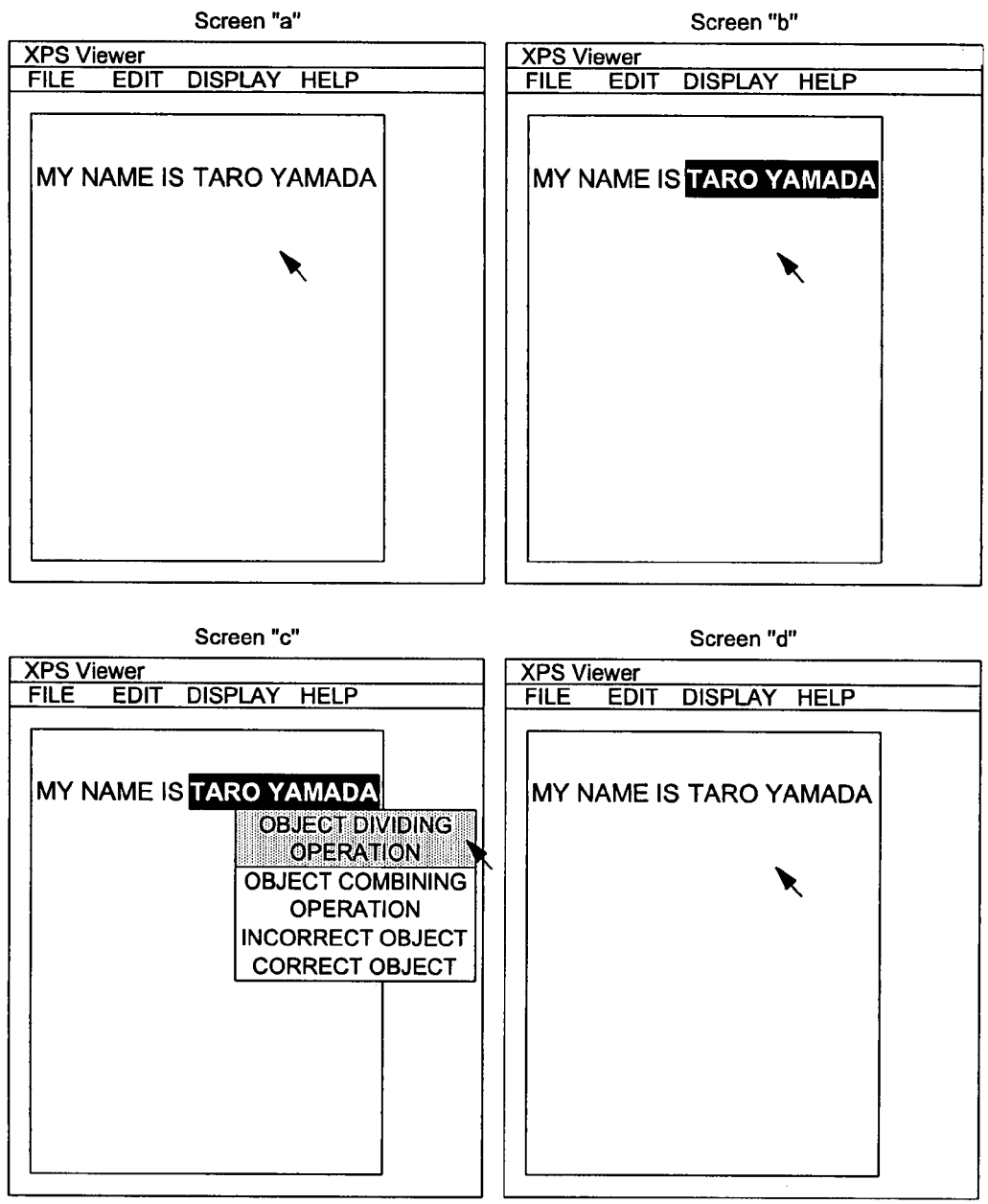
FIG. 17 shows an explanatory drawing for explaining a procedure of creating document data (screens for dividing a text represented by text data, which are included in the document data) in the second embodiment of the present invention.

The chart and the Screens shown in FIG. 16 and FIG. 17 schematically indicate transitions of the operations conducted in Step S312 through Step S319. As shown in FIG. 16, the operations include: selecting the character string to be divided by using the mouse (refer to Screen "a" and Screen "b"); selecting "DIVIDING OPERATION OF OBJECT" from the Edit menu temporally displayed on the screen (refer to Screen "c"); and trimming off the selected range from the original text so as to divide the original text (refer to Screen "d"). At this time, as shown in FIG. 16, the font file linked to the original text is copied, so as to link the copied font file to each of the divided objects.

Successively, the creator of the document data determines whether or not the dividing operation should be continued (Step S320). When determining that the dividing operation should be continued, the creator repeats the operations from Step S303 to Step S319. In this connection, since the above-mentioned operation for dividing the object should be conducted when a part of the specific object cannot be disclosed to all of the users, it is possible to omit the operation for dividing the object when whole contents included in a single object cannot be disclosed.

Still successively, the creator of the document data determines whether or not the digest value to be attached to the object should be designated (Step S321). When determining that the digest value should be designated, the creator selects an object to which the digest value is to be attached (Step S322). Then, the creator of the document data determines whether or not an erroneous value, being different from the digest value normally calculated from the designated object, should be attached to the designated object as its digest value (Step S323). When determining that the erroneous value should be attached to the designated object, the digital signature section 31*b* turns the flag of the digest value to "false" (Step S325), while, when determining that the erroneous value should not be attached to the designated object, the digital signature section 31*b* turns the flag of the digest value to "true" (Step S324). Further, the creator of the document data determines whether or not the operations for designating the digest value should be continued (Step S326). When determining that the operations for designating the digest value should be continued, the creator repeats the operations from Step S321 to Step S325.

Figure 18:
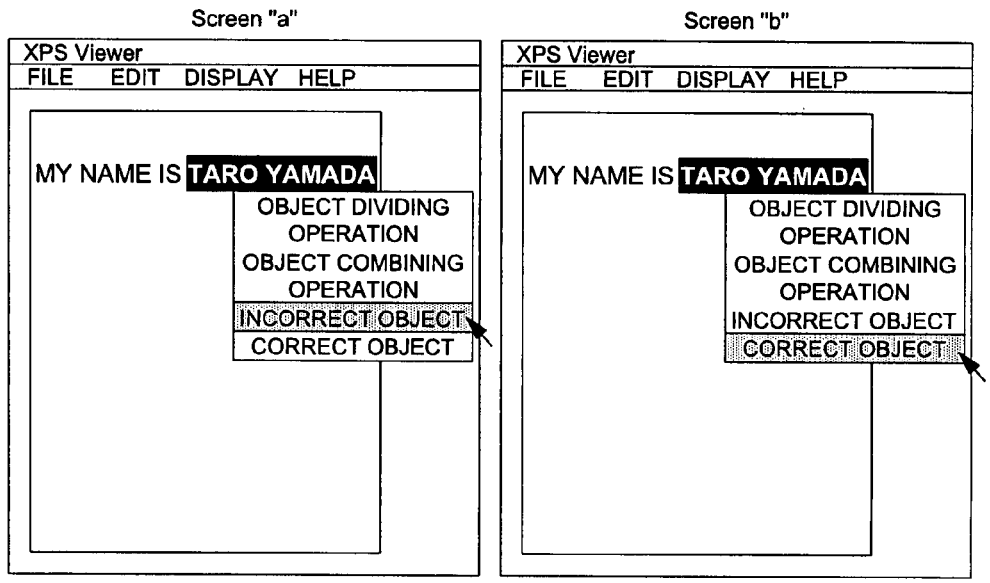
FIG. 18 shows an explanatory drawing for explaining a procedure of creating document data (screens for establishing a digest value for a text represented by text data, which are included in the document data) in the second embodiment of the present invention.

The Screens shown in FIG. 18 schematically indicate transitions of the operations conducted in Step S322 through Step S325. As shown in FIG. 18, the operations include: selecting the object, to which the erroneous digest value is to be attached, by using the mouse, and selecting the item of "ERRONEOUS DIGEST VALUE" from the Edit menu (refer to Screen "a"); or selecting the object, to which the correct digest value is to be attached, by using the mouse, and selecting the item of "CORRECT DIGEST VALUE" from the Edit menu (refer to Screen "b"). When selecting the item of "ERRONEOUS DIGEST VALUE", the digest value flag for controlling the digest value to be attached to the object is turned to "false", while, when selecting the item of "CORRECT DIGEST VALUE", the digest value flag is turned to "true".

Still successively, the processing enters into the digital signature processing. Concretely speaking, the digital signature section 31*b* determines whether the digest value flag is "false" or "true" (Step S327). When determining that the digest value flag is "false", the digital signature section 31*b* adds a predetermined value (1 in this embodiment) to the correct digest value (namely, the digest value calculated from the object) so as to attach the erroneous digest value (namely, correct digest value +1) to the object concerned (Step S328), while, when determining that the digest value flag is "true", the digital signature section 31*b* attaches the correct digest value to the object concerned (Step S329). In this connection, although a predetermined value is added to the correct digest value when the digest value flag is "false" in the abovementioned embodiment, it is also applicable that a predetermined value is subtracted from the correct digest value, or the digest value is substituted by an abnormal value established in advance, as mentioned in the first embodiment. Further, the creator of the document data determines whether or not the operations for establishing the digest value should be continued (Step S330). When determining that the operations for establishing the digest value should be continued, the creator repeats the operations from Step S327 to Step S329.

Still successively, the processing enters into the printing operation (Step S331). Concretely speaking, after the document data attached with the digital signature have been created in the computer terminal device 30, the creator of the document data inputs the instruction of the printing operation from the inputting section 33. In response to the instruction inputted by the creator, the control section 31 makes the display section 34 display a predetermined print setting screen. Then, the creator selects one of Keywords, corresponding to the desired printing mode ("Print Only Valid Part" is selected in this case), from the list displayed in the print setting screen. In response to the creator's selection, the control section 31 transmits the document data (namely, the XPS data) attached with the digital signature and the selected Keyword to the image forming apparatus 20.

The control section 21 of the image forming apparatus 20 extracts the Keyword attached to the XPS data received from the computer terminal device 30, so as to establish the printing mode based on the extracted Keyword (in this case, the mode for printing only such the object that has the correct digest value of the digital signature). Further, the control section 21 calculates the digest value for every object included in the XPS data received from the computer terminal device 30, so as to determine whether or not the object concerned is valid, by comparing the calculated digest value with that attached to the XPS data. With respect to the object that is determined as valid, the control section 21 converts XPS data, corresponding to the concerned object, to the intermediate data, and then, creates the bitmap data from the intermediate data by implementing the rasterize processing in a unit of bundle (for instance, the processing for developing the information of the vector form, to convert them into a confluence of points).

After that, the control section 21 transmits the bitmap data to the printer section 25 for every bundle. Receiving the bitmap data, the printer section 25 implements the printing operation including the steps of: forming a toner image based on the bitmap data on a photoreceptor drum; transferring the toner image onto a paper sheet recording medium from the photoreceptor drum through a primary transferring roller and a secondary transferring belt; and fixing the toner image onto the paper sheet recording medium.

Figure 19:
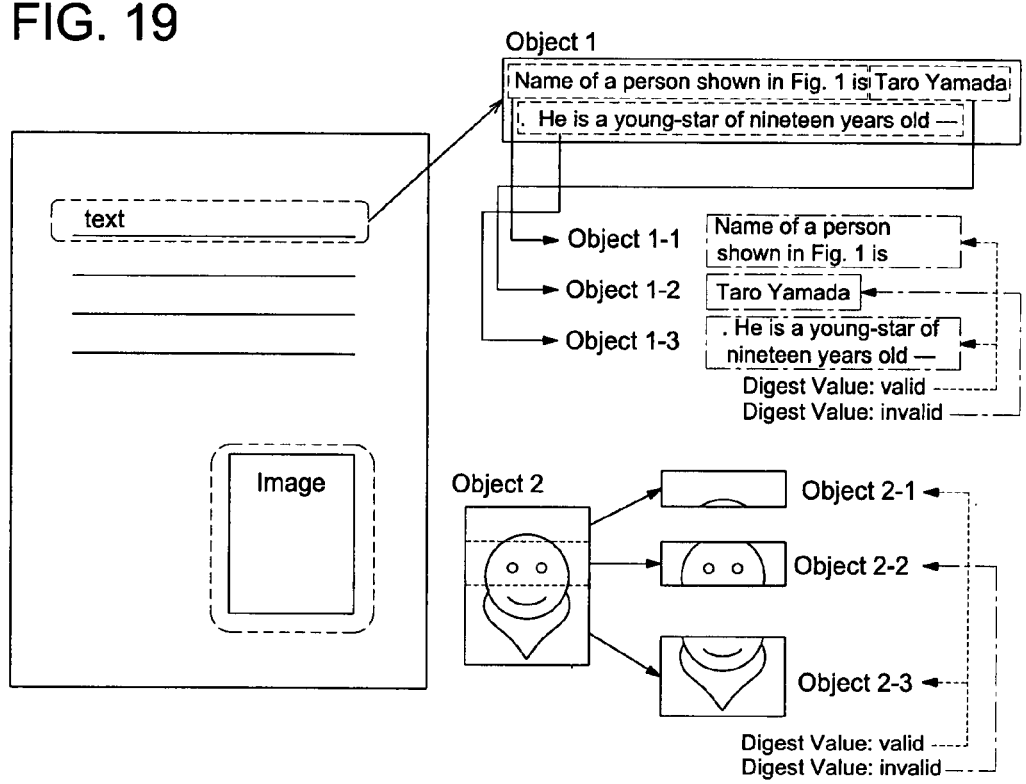
FIG. 19 shows an example of document data to be processed in the second embodiment of the present invention.
Figure 20:
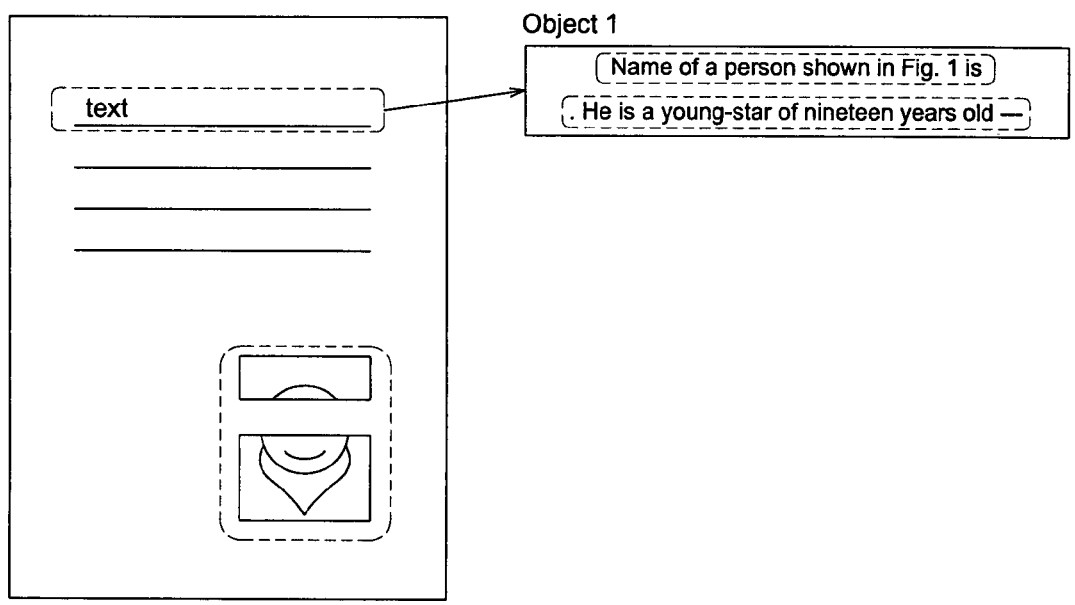
FIG. 20 shows an example of a printed document based on document data processed in the second embodiment of the present invention.

Referring to FIG. 19 and FIG. 20, the consecutive procedure, described in the above, will be further detailed in the following. As shown in FIG. 19, a single document includes two objects, which are a text and an image (hereinafter, referred to as an object 1 and an object 2, respectively). Further, the object 1, representing the text, is divided into three objects (hereinafter, referred to as an object 1-1, an object 1-2 and an object 1-3, respectively), while the object 2, representing the image, is also divided into three objects (hereinafter, referred to as an object 2-1, an object 2-2 and an object 2-3, respectively). Under the above condition, when it is assumed that invalid digest values are attached to the object 1-2 and the object 2-2, the image forming apparatus 20 implements the printing operations only for the object 1-1, the object 1-3, the object 2-1 and the object 2-3, without printing the object 1-2 and the object 2-2, since the digest values of the object 1-2 and the object 2-2 are incorrect. Accordingly, it becomes possible to create a document on which portions designated by the user are not printed.

As mentioned in the foregoing, since the computer terminal device 30 is provided with the object designating section 31a that divides the object according to the instructions inputted by the user, and the digital signature section 31b that attaches a value, being different from the value normally derived from each of the divided objects, to corresponding one of the divided objects, it becomes possible to establish a disclosing or closing status of the concerned object at the time of creating the document data, resulting in improvement of the user's convenience.

In this connection, although the case in which the document data are created on the basis of the XPS is exemplified in the abovementioned embodiment, the present invention is also applied to an arbitral standard, which makes it possible to establish whether or not the image represented by the document data or each of the objects should be printed, corresponding to the digest value, as well.

Further, the present invention is not limited to the embodiments disclosed in the foregoing. The present invention is also applicable for such an apparatus that is provided with a function for attaching an abnormal value to a part of data as the characteristic value employed for the digital signature, a data creating method employing such the apparatus and a control program to be executed in the apparatus.

The present invention can be utilized for a document data creating apparatus, which is capable of creating document data to which a digital signature is attached for every object, a document data creating method, which employs the document data creating apparatus and a control program to be executed in the document data creating apparatus.

Further, in the case that it is desirable that some portion of the document should be disclosed only for a specific user when creating the document data in the computer terminal device, the object designating section divides the specific object designated by the creator or the designated range of the specific object into the divided objects. Then, the digital signature section attaches a value, which is different from the value normally calculated from the specific object or the divided object, to the specific object or the divided object concerned. Accordingly, by establishing the printing mode in which only an object, whose characteristic value is valid, is printed, it becomes possible to prevent implementation of the printing operation of the specific object or the divided object concerned.

While the preferred embodiments of the present invention have been described using specific term, such description is for illustrative purpose only, and it is to be understood that changes and variations may be made without departing from the spirit and scope of the appended claims.

What is claimed is:

1. A document data creating apparatus for creating document data that include a digital signature, comprising:
   a characteristic value calculating section to calculate a characteristic value of the document data based on the document data; and
   a digital signature section to attach selectively the characteristic value of the document data calculated by the characteristic value calculating section or a value, which is different from the characteristic value calculated by the characteristic value calculating section, to the document data as the digital signature to be included in the document data.

2. A document data creating apparatus for creating document data that include a digital signature, comprising:
   a character recognizing section to recognize a character based on image data inputted;
   a reliability determining section to determine a reliability degree of the character recognized by the character recognizing section;
   a characteristic value calculating section to calculate a characteristic value of the document data based on the document data; and
   a digital signature section to attach the characteristic value, serving as the digital signature, to the document data;
   wherein, when the reliability determining section determines that the reliability degree of the character is low, the digital signature section attaches a value, which is derived from and different from the characteristic value calculated by the characteristic value calculating section, to the document data as the digital signature to be included in the document data.

3. The document data creating apparatus of claim 2,
   wherein the characteristic value is attached to every object included in the document data, and the characteristic value calculating section calculates the characteristic value for every object included in the document data; and
   wherein, when the reliability determining section determines that the reliability degree of the character included in a specific object is low, the digital signature section attaches a value, which is derived from and different from the characteristic value of the specific object, calculated by the characteristic value calculating section, to the specific object as the digital signature to be included in the document data.

4. A document data creating apparatus for creating document data that include a digital signature, comprising:
   a characteristic value calculating section to calculate a characteristic value for every object included in the document data based on the document data;
   a digital signature section to attach the characteristic value, serving as the digital signature, to every object included in the document data; and
   an object designating section to designate a specific object included in the document data;
   wherein the digital signature section selectively attaches a value, which is different from the characteristic value of the specific object, calculated by the characteristic value calculating section, to the specific object, designated by the object designating section, as the digital signature to be included in the document data.

5. The document data creating apparatus of claim 4,
   wherein the specific object is one of divided objects acquired by extracting a designated range of an object designated by the object designating section.

6. The document data creating apparatus of claim 5,
   wherein the object designating section creates a new object from the object designated by the object designating section, by filling a partial area of the object, from which the specific object is extracted, with a predetermined color; and
   wherein the object designating section establishes a hierarchy order of the new object and the specific object so that the specific object overrides the new object.

7. The document data creating apparatus of claim 4,
   wherein the document data are created, based on a XPS; and
   wherein information for instructing a printing apparatus to implement a printing operation in a predetermined print mode, in which an object, the characteristic value of which is valid, should be printed, while another object, the characteristic value of which is invalid, should not be printed, are attached to the document data.

8. A document data creating method for creating document data that include a digital signature, comprising:

calculating a characteristic value of the document data based on the document data; and attaching selectively the calculated characteristic value of the document data or a value, which is different from the characteristic value calculated in the calculating step, to the document data as the digital signature to be included in the document data.

9. A document data creating method for creating document data that include a digital signature, comprising:

recognizing a character based on image data inputted;

determining a reliability degree of the character recognized in the recognizing step;

calculating a characteristic value of the document data based on the document data; and attaching the characteristic value, serving as the digital signature, to the document data;

wherein, when it is determined that the reliability degree of the character is low, a value, which is derived from and different from the characteristic value calculated in the calculating step, is attached to the document data as the digital signature to be included in the document data.

10. The document data creating method of claim 9, wherein the characteristic value is attached to every object included in the document data, and the characteristic value is calculated for every object included in the document data; and wherein, when it is determined that the reliability degree of the character included in a specific object is low, a value, which is derived from and different from the characteristic value of the specific object, calculated in the calculating step, is attached to the specific object as the digital signature to be included in the document data.

11. A document data creating method for creating document data that include a digital signature, comprising:

calculating a characteristic value for every object included in the document data based on the document data;

attaching the characteristic value, serving as the digital signature, to every object included in the document data; and designating a specific object included in the document data;

wherein a value, which is different from the characteristic value of the specific object, calculated in the calculating step, is selectively attached to the specific object, designated in the designating step, as the digital signature to be included in the document data.

12. The document data creating method of claim 11, wherein the specific object is one of divided objects acquired by extracting a designated range of an object designated by the object designating section.

13. The document data creating method of claim 12, wherein a new object is created from the object designated in the designating step, by filling a partial area of the object, from which the specific object is extracted, with a predetermined color; and wherein a hierarchy order of the new object and the specific object is established so that the specific object overrides the new object.

14. The document data creating method of claim 11, wherein the document data are created, based on a XPS; and wherein information for instructing a printing apparatus to implement a printing operation in a predetermined print mode, in which an object, the characteristic value of which is valid, should be printed, while another object, the characteristic value of which is invalid, should not be printed, are attached to the document data.

15. A computer readable medium storing a computer executable program for creating document data that include a digital signature, the program comprising program code for causing a computer to perform the steps of:

calculating a characteristic value of the document data based on the document data; and attaching selectively the calculated characteristic value of the document data or a value, which is different from the characteristic value calculated in the calculating step, to the document data as the digital signature to be included in the document data.

16. A computer readable medium storing a computer executable program for creating document data that include a digital signature, the program comprising program code for causing a computer to perform the steps of:

recognizing a character based on image data inputted;

determining a reliability degree of the character recognized in the recognizing step;

calculating a characteristic value of the document data based on the document data; and attaching the characteristic value, serving as the digital signature, to the document data;

wherein, when it is determined that the reliability degree of the character is low, a value, which is derived from and different from the characteristic value calculated in the calculating step, is attached to the document data as the digital signature to be included in the document data.

17. The computer readable medium of claim 16, wherein the characteristic value is attached to every object included in the document data, and the characteristic value is calculated for every object included in the document data; and wherein, when it is determined that the reliability degree of the character included in a specific object is low, a value, which is derived from and different from the characteristic value of the specific object, calculated in the calculating step, is attached to the specific object as the digital signature to be included in the document data.

18. A computer readable medium storing a computer executable program for creating document data that include a digital signature, the program comprising program code for causing a computer to perform the steps of:

calculating a characteristic value for every object included in the document data based on the document data;

attaching the characteristic value, serving as the digital signature, to every object included in the document data; and designating a specific object included in the document data;

wherein a value, which is different from the characteristic value of the specific object, calculated in the calculating step, is selectively attached to the specific object, designated in the designating step, as the digital signature to be included in the document data.

19. The computer readable medium of claim 18,
wherein the specific object is one of divided objects acquired by extracting a designated range of an object designated by the object designating section.

20. The computer readable medium of claim 19,
wherein a new object is created from the object designated in the designating step, by filling a partial area of the object, from which the specific object is extracted, with a predetermined color; and
wherein a hierarchy order of the new object and the specific object is established so that the specific object overrides the new object.

21. The computer readable medium of claim 18,
wherein the document data are created, based on a XPS; and
wherein information for instructing a printing apparatus to implement a printing operation in a predetermined print mode, in which an object, the characteristic value of which is valid, should be printed, while another object, the characteristic value of which is invalid, should not be printed, are attached to the document data.

* * * * *